(12) United States Patent
Nagano et al.

(10) Patent No.: US 8,138,744 B2
(45) Date of Patent: Mar. 20, 2012

(54) COMBINED TYPE TRANSFORMER AND BUCK-BOOST CIRCUIT USING THE SAME

(75) Inventors: Masao Nagano, Wako (JP); Mitsuaki Hirakawa, Wako (JP); Toshihisa Shimizu, Hachioji (JP)

(73) Assignees: Honda Motor Co., Ltd., Tokyo (JP); Toshihisa Shimizu, Tokyo (JP)

( * ) Notice: Subject to any disclaimer, the term of this patent is extended or adjusted under 35 U.S.C. 154(b) by 0 days.

(21) Appl. No.: 12/849,918

(22) Filed: Aug. 4, 2010

(65) Prior Publication Data
US 2010/0320982 A1 Dec. 23, 2010

Related U.S. Application Data

(62) Division of application No. 12/068,310, filed on Feb. 5, 2008, now Pat. No. 7,808,355.

(30) Foreign Application Priority Data

Feb. 6, 2007 (JP) ................................. P2007-027281

(51) Int. Cl.
*G05F 1/59* (2006.01)
(52) U.S. Cl. ........ 323/350; 323/222; 323/271; 323/282; 323/351
(58) Field of Classification Search .................. 323/222, 323/271, 272, 282, 350, 351
See application file for complete search history.

(56) References Cited

U.S. PATENT DOCUMENTS

| | | | |
|---|---|---|---|
| 2,344,294 A | 3/1944 | Evans | |
| 2,644,109 A | 6/1953 | Mulder | |
| 2,771,587 A | 11/1956 | Henderson | |
| 3,128,443 A | 4/1964 | Herman et al. | |
| 3,175,175 A | 3/1965 | Hauck | |
| 3,271,714 A | 9/1966 | Cossaart | |
| 3,278,878 A | 10/1966 | Collucci | |
| 3,289,280 A | 12/1966 | Jones | |
| 3,657,678 A | 4/1972 | Schwenden | |
| 4,470,006 A | 9/1984 | Drapp | |
| 4,592,133 A | 6/1986 | Grimes et al. | |
| 4,859,978 A | 8/1989 | Feather et al. | |
| 5,455,553 A | 10/1995 | Allan et al. | |
| 5,481,238 A | 1/1996 | Carsten et al. | |
| 5,566,443 A | 10/1996 | Allan et al. | |
| 5,789,907 A | 8/1998 | Casagrande | |
| 6,014,071 A | 1/2000 | Onishi et al. | |
| 6,046,664 A | 4/2000 | Weller et al. | |
| 6,784,781 B1 | 8/2004 | Collins et al. | |

FOREIGN PATENT DOCUMENTS

| EP | 0451628 A | 10/1991 |
|---|---|---|
| EP | 1732198 A2 | 12/2006 |
| JP | 2003-111390 A | 4/2003 |
| JP | 2006-149054 A | 6/2006 |

*Primary Examiner* — Jeffrey Sterrett
(74) *Attorney, Agent, or Firm* — Birch, Stewart, Kolasch & Birch, LLP

(57) ABSTRACT

Combined type transformer includes: a transformer core; first and second coils provided with respect to the transformer core; first and second inductor cores provided around the first coil; and third and fourth inductor cores provided around the second coil. The transformer core and the first and second coils constitute a transformer, the first coil and the first and second inductor cores constitute a first inductor, and the second coil and the third and fourth inductor cores constitute a second inductor.

15 Claims, 13 Drawing Sheets

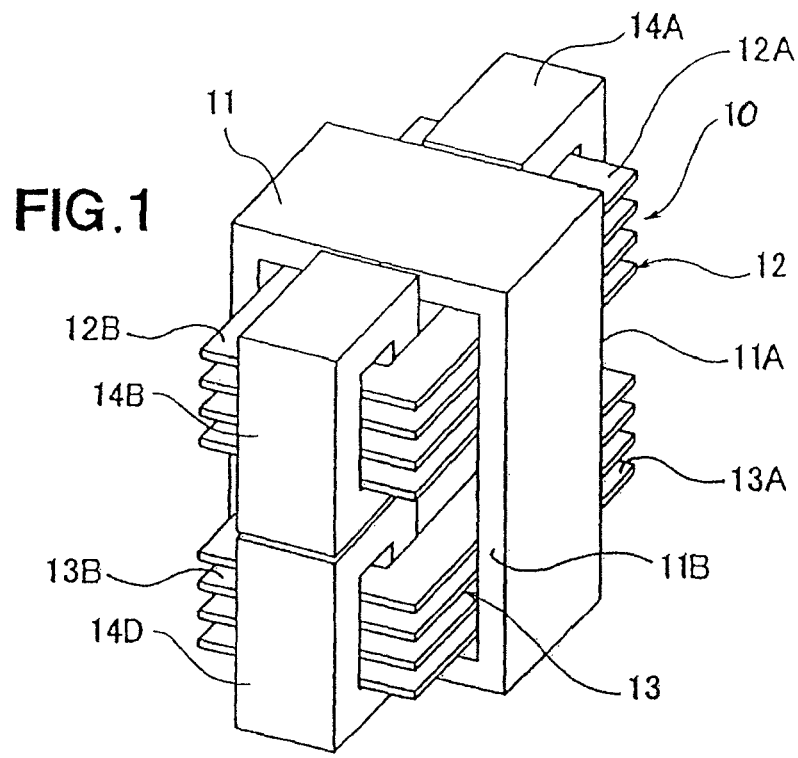
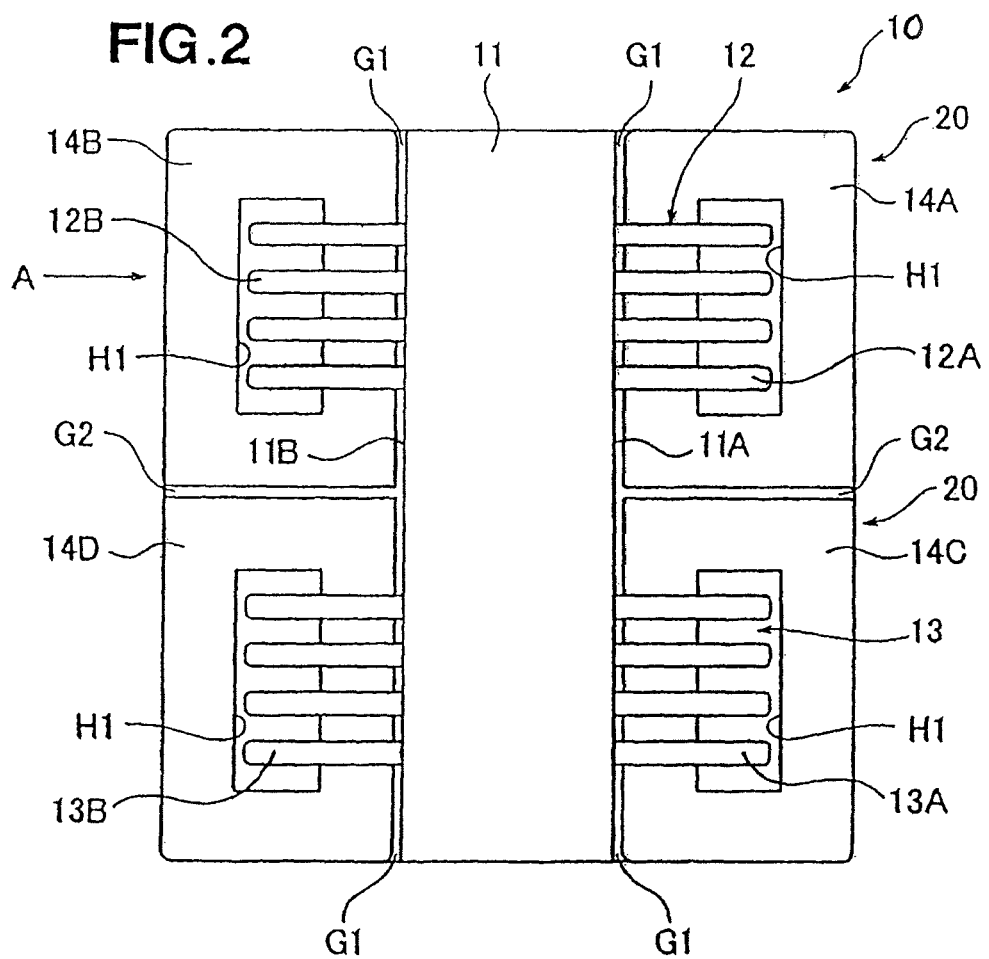

US 8,138,744 B2

COMBINED TYPE TRANSFORMER AND BUCK-BOOST CIRCUIT USING THE SAME

CROSS-REFERENCE TO RELATED APPLICATION

The present application in a Divisional Application of U.S. patent application Ser. No. 12/068,310 filed Feb. 5, 2008, claims priority under 35 U.S.C. §119 to Japanese Patent Application No. 2007-027281, filed Feb. 6, 2007, the entire contents of which are hereby incorporated by reference.

BACKGROUND OF THE INVENTION

1. Field of the Invention

The present invention relates generally to combined type transformers and buck-boost circuits using such a combined type transformer, and more particularly to an improved combined type transformer having both of inductor and transformer functions and an improved buck-boost circuit using the improved combined type transformer.

2. Description of Background Art

Heretofore, there have been proposed various voltage boosting circuits (for example, JP 2003-111390 A and JP 2003-216255 A). FIG. 22 hereof shows a fundamental circuit structure of the conventional voltage boosting circuit 100 disclosed in one of the above-identified publications.

As shown in FIG. 22, the voltage boosting circuit 100 includes an input-side smoothing capacitor 102, a coil (inductor) 101, a switching element 103, a diode 104, and an output-side smoothing capacitor 105. The input-side smoothing capacitor 102 is connected between a negative-pole terminal 106 and an input terminal 107 that is a positive-pole terminal, and the output-side smoothing capacitor 105 is connected between a negative-pole terminal 106 and an output terminal 108 that is a positive-pole terminal. DC reference line 110 is provided between the two negative-pole terminals 106. The switching element 103 is connected between a node 109, interconnecting the coil 101 and a node 104, and the DC reference line 110. The switching element 103 is a transistor, such as an Insulated-Gate Bipolar Transistor (IGBT), which has characteristics of both a Metal-Oxide-Semiconductor Field-Effect Transistor (MOSFET) and a bipolar transistor. Gate signal SG111 is supplied by a not-shown control unit to a gate-source terminal of the switching element 103 so that ON/OFF control of the switching element 103 is performed on the basis of the supplied gate signal SG111.

Predetermined input voltage is applied between the input terminal 107 and the negative-pole terminal 106. Once the switching element 103 is turned on, an electric current flows through a loop, constituted by the coil 101, switching element 103, node b and node a, on the basis an electric charge stored in the input-side smoothing capacitor 102. During that time, the coil 101 is energized so that magnetic energy is stored in the coil 101. Then, once the switching element 103 is turned off, the magnetic energy stored in the coil 101 is discharged to the output-side smoothing capacitor 105. As a consequence, an output voltage greater than the input voltage applied between the input terminal 107 and the negative-pole terminal 106 is produced between the output terminal 108 and the negative-pole terminal 106. Intensity of the output voltage depends on the input voltage, switching duty, etc.

With the aforementioned voltage boosting circuit 100, where the voltage is boosted by temporarily storing the magnetic energy in the single coil 101, the coil 101 has to be extremely increased in size and weight, in order to store therein sufficient magnetic energy without causing magnetic saturation. Further, if an attempt is made to increase a voltage boost ratio in the voltage boosting circuit 100, undesired magnetic saturation of the magnetic core and lowering of the voltage boost ratio may occur.

In view of the foregoing, the assignee of the instant application has proposed a buck-boost DC/DC converter which permits reduction in size and weight of the coil (inductor) while reliably preventing magnetic saturation of the coil 101 and which can continuously vary the voltage-booting ratio (see JP 2006-149054 A).

FIG. 23 is a circuit diagram showing the DC/DC converter 200 disclosed in JP 2006-149054 A. The DC/DC converter 200 includes an inductor (coil) L0, a transformer T1, a core 221 and diodes 22, 23, 24, 25. FIGS. 24A and 24B and FIGS. 25A and 25B show a conventionally-known inductor and transformer applicable to the DC/DC converter 200 of FIG. 23.

FIG. 24A is a perspective view of the inductor 230 applicable to the DC/DC converter 200, and FIG. 24B is a schematic plan view of the inductor 230. Further, FIG. 25A is a perspective view of the transformer 240 applicable to the DC/DC converter 200, and FIG. 25B is a schematic plan view of the transformer 240.

As shown in FIGS. 24A and 24B, the inductor 230 includes a core section 232, an insulator 234, and a winding 236 having terminals 236a and 236b. The insulator 234 insulates the core 232 and winding 236 from each other. The winding 236 is wound around a center core 238 of the core section 232.

As shown in FIGS. 25A and 25B, the transformer 240 includes a core section 242, and windings 244 and 246 having respective terminals 244a, 244b and 246a, 246b. The windings 244 and 246 are wound around a center core 248 of the core section 242 and insulated from each other via an insulting sheet or the like.

The terminal 236a shown in FIG. 24A is connected to an input terminal TA1 shown in FIG. 23, and the terminals 244a and 2346a shown in FIG. 25A are both connected to the terminal 236a shown in FIG. 24A. Further, the terminal 244b shown in FIG. 25A is connected to a switching element SW1 shown in FIG. 23, and the terminal 246b shown in FIG. 25A is connected to a switching element SW3 shown in FIG. 23.

In the case where the inductor and transformer, constituting the DC/DC converter, are provided as separate components as set forth above, it would be difficult to reduce the size and weight of the DC/DC converter. Further, in the case where the conventionally-known inductor 230 and transformer 240 as shown in FIGS. 24A and 24B and 25A and 25B are employed, magnetic fluxes produced by electric currents flowing through the coils would undesirably disperse because projecting portions of the coils (windings) (which project outwardly from the core sections in the plan views of FIGS. 24B and 25B) and connecting portions of the coils (windings) between the terminal 236b of FIGS. 24A and 24B and the terminals 244b and 246b of FIGS. 25A and 25B have great cubic volumes. This is because the magnetic fluxes passing through the cores in response to the electric currents flowing through the coils are relatively reduced if the projecting portions and connecting portions of the coils are great in cubic volume. As a consequence, the (mutual) inductance would undesirably stay at low values as compared to the cubic volumes of the coils, which also makes it difficult to reduce the size and weight of the DC/DC converter. Also, the large connecting portions between the inductor and the transformer would undesirably lower the power conversion efficiency due to a large conduction loss.

SUMMARY OF THE INVENTION

In view of the foregoing prior art problems, it is an object of the present invention to provide a small-size, lightweight combined type transformer having functions of both an inductor and transformer, and a buck-boost circuit employing such a small-size, lightweight combined type transformer.

In order to accomplish the above-mentioned object, the present invention provides an improved combined type transformer, which comprises: first and second coils; a transformer core having the first and second coils wound therearound; and at least one inductor core provided in correspondence with at least one of the first and second coils.

The combined type transformer of the present invention is constructed so that both a section functioning as a transformer (i.e., transformer section) and a section functioning as an inductor (i.e., inductor section) are incorporated in a single structure. Namely, the two, i.e. first and second, coils are shared between the transformer section and the inductor section; for this purpose, winding portions of the two coils are set for use as the transformer, and the other winding portions of the coils are set for use as the inductor.

Preferably, at least one of the first and second coils has a projecting coil portion that projects outwardly from at least one side surface of the transformer core, and the inductor core is provided in the projecting coil portion. In the fundamental transformer structure comprising the transformer core and first and second coils, an inductor is additionally implemented by providing the above-mentioned projecting coil portion in the first or second coil and providing the inductor core in the projecting coil portion.

Preferably, each of the first and second coils has projecting coil portions that project outwardly from opposite side surfaces of the transformer core. Two inductor cores are provided in the respective projecting coil portions of the first coil, and other two inductor cores are provided in the respective projecting coil portions of the second coil.

Preferably, each of the first and second coils has a substantially rectangular ring shape, and one pair of opposed sides of each of the first and second coils is used as a transformer-related coil portion while another pair of opposed sides of each of the first and second coils is used as an inductor-related coil portion.

Preferably, the transformer core and the inductor cores are formed of different materials.

According to another aspect of the present invention, there is provided an improved combined type transformer, which comprises: a transformer core; first and second coils provided with respect to the transformer core; first and second inductor cores provided around the first coil; and third and fourth inductor cores provided around the second coil. The transformer core and the first and second coils together constitute a transformer, the first coil and the first and second inductor cores together constitute a first inductor, and the second coil and the third and fourth inductor cores together constitute a second inductor.

Preferably, the first coil provided for the transformer is used also as a coil for the first inductor, and the second coil provided for the transformer is used also as a coil for the second inductor.

Preferably, the transformer core has a middle magnetic path portion and side magnetic path portions located at opposite sides of the middle magnetic path portion, and the first coil is provided in an upper region of the middle magnetic path portion while the second coil is provided in a lower region of the middle magnetic path portion.

Preferably, the first coil has projecting coil portions that project outwardly from opposite side surfaces of the transformer core, and the first and second inductor cores are provided around the respective projecting coil portions of the first coil. The second coil has projecting coil portions that project outwardly from opposite side surfaces of the transformer core, and the third and fourth inductor cores are provided around the respective projecting coil portions of the second coil.

In the combined type transformer of the present invention, the transformer and inductor, which used to be constructed as separate electric components in the prior art, are integrally formed with the winding portions projecting outwardly from the transformer core (i.e., projecting coil portions) used as coils of the inductor. By virtue of such shared use of the coils between the transformer and the inductor, the inventive combined type transformer can be constructed in a compact size and installed in a narrow space, making efficient use of the limited space with spatial waste minimized. As a result, it is possible to not only reduce the total length of the windings located in the transformer and inductor, but also achieve a lower I 2R loss.

Namely, according to the present invention, the transformer and inductor are constructed integrally as a single structure of a compact size, using only structurally-essential portions and making efficient use of a limited space, so that the combined type transformer can be implemented in significantly reduced size and weight and with minimized wasteful space.

According to still another aspect of the present invention, there is provided an improved voltage buck/boost circuit including first and second terminals, an inductor, a transformer and a plurality of switching elements, which comprises: the aforementioned improved combined type transformer (which comprises: a transformer core; an inductor core; and first and second coils each wound around not only the transformer core but also the inductor core), the first and second coils being each connected at one end thereof to a positive-pole terminal of the first terminal; a first switching element connected at one end thereof to the other end of the first coil and connected at the other end thereof to a common reference terminal; a second switching element connected at one end thereof to the other end of the first coil and connected at the other end thereof to a positive-pole terminal of the second terminal; a third switching element connected at one end thereof to the other end of the second coil and connected at the other end thereof to the common reference terminal; and a fourth switching element connected at one end thereof to the other end of the second coil and connected at the other end thereof to the positive-pole terminal of the second terminal.

According to still another aspect of the present invention, there is provided an improved voltage boost circuit including first and second terminals, an inductor, a transformer and a plurality of switching elements, which comprises: the aforementioned improved combined type transformer, the first and second coils being each connected at one end thereof to a positive-pole terminal of the first terminal; a first switching element connected at one end thereof to the other end of the first coil and connected at the other end thereof to a common reference terminal; a first diode connected at one end thereof to the other end of the first coil and connected at the other end thereof to a positive-pole terminal of the second terminal; a second switching element connected at one end thereof to the other end of the second coil and connected at the other end thereof to the common reference terminal; and a second diode connected at one end thereof to the other end of the second coil and connected at the other end thereof to the positive-pole terminal of the second terminal.

According to still another aspect of the present invention, there is provided an improved voltage buck circuit including first and second terminals, an inductor, a transformer and a plurality of switching elements, which comprises: the aforementioned improved combined type transformer, the first and second coils being each connected at one end thereof to a positive-pole terminal of the first terminal; a first diode connected at one end thereof to the other end of the first coil and connected at the other end thereof to a common reference terminal; a first switching element connected at one end thereof to the other end of the first coil and connected at the other end thereof to a positive-pole terminal of the second terminal; a second diode connected at one end thereof to the other end of the second coil and connected at the other end thereof to the common reference terminal; and a second switching element connected at one end thereof to the other end of the second coil and connected at the other end thereof to the positive-pole terminal of the second terminal.

In each of the aforementioned voltage buck/boost circuit, voltage boost circuit and voltage buck circuit, each of the switching elements may be an IGBT, or a MOSFET.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 1 is an overall perspective view of a combined type transformer in accordance with an embodiment of the present invention;

FIG. 2 is a front view of the combined type transformer;

DETAILED DESCRIPTION OF THE PREFERRED EMBODIMENTS

Figure 3:
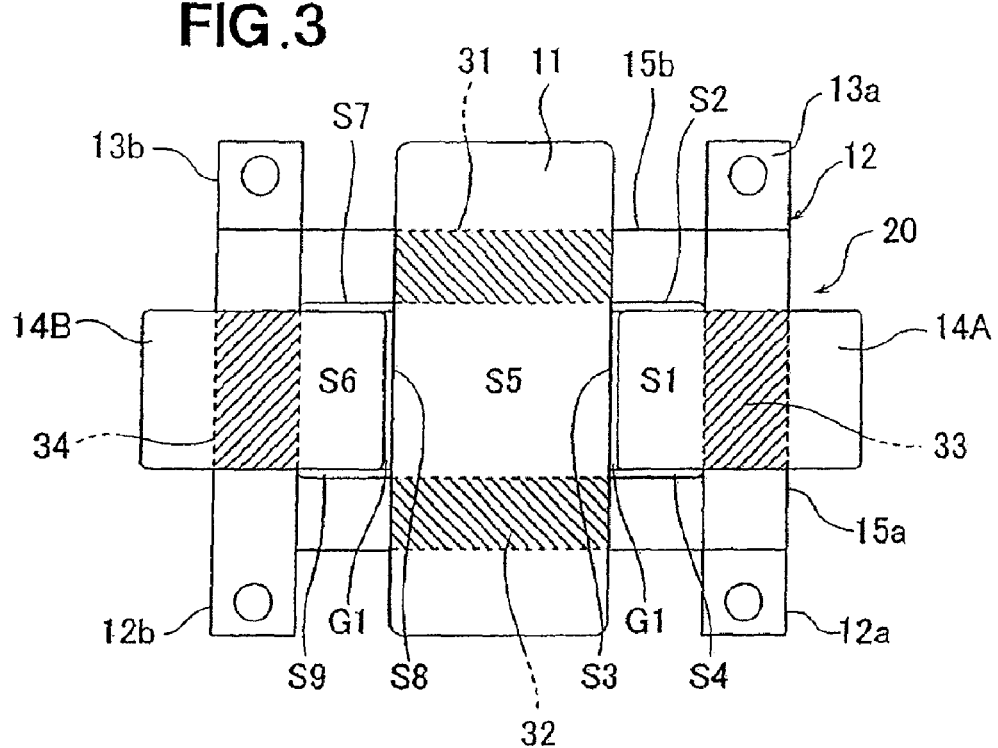
FIG. 3 is a plan view of the combined type transformer.

First, with reference to FIGS. 1-4, a description will be made as to the shape and construction of a combined type transformer 10 according to a preferred embodiment of the present invention. FIGS. 1, 2 and 3 respectively show in perspective, front elevation and top plan the combined type transformer 10, while FIG. 4 shows the combined type transformer 10 as viewed in a direction of arrow A of FIG. 2 (with inductor cores removed).

Figure 4:
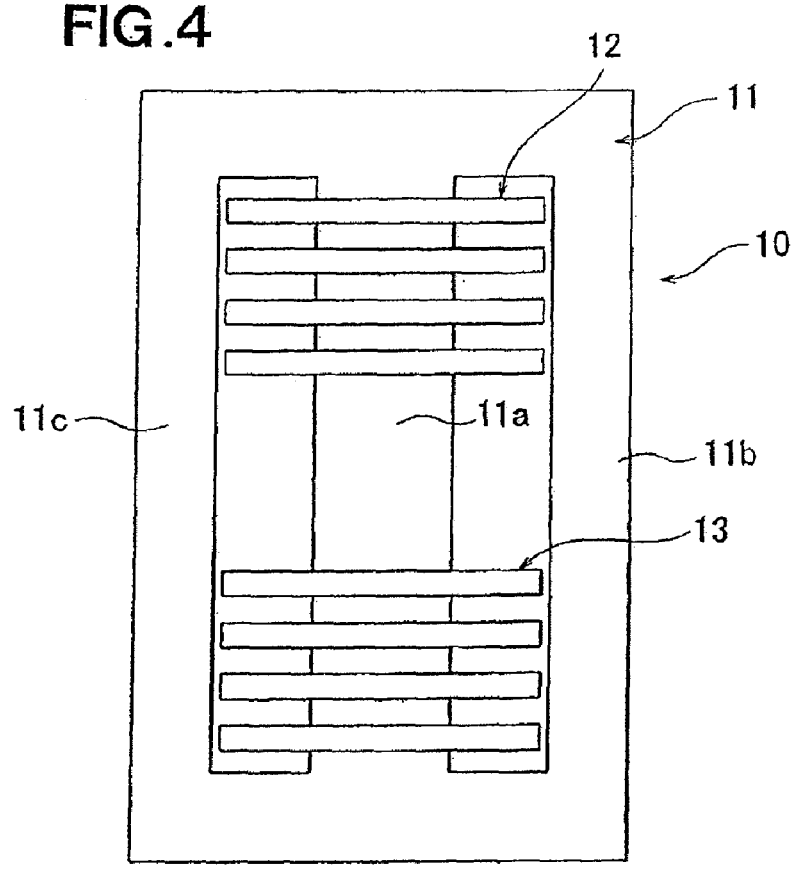
FIG. 4 is a view of the combined type transformer taken in the direction of arrow A of FIG. 2 with inductor cores removed.

The combined type transformer 10 includes a transformer core 11 made of, for example, ferrite, and, as shown in FIG. 4, the transformer core 11 has a middle magnetic path portion 11a, and side magnetic path portions 11b and 11c located at opposite sides of the middle magnetic path portion 11a in parallel to the latter. The transformer core 11 functions as an iron core that allows the transformer 10 to perform a voltage transforming action. Coils 12 and 13 are wound around upper and lower regions, respectively, of the middle magnetic path portion 11a of the transformer core 11. The coils 12 and 13 function as primary and secondary windings L1 and L2, respectively, of the transformer 10. Each of the coils 12 and 13 is an elongated plate-shaped member having a predetermined thickness and width and helically wound so that the number of turns thereof is, for example, four. The transformer core 11 and coils 12 and 13 together constitute the transformer 10.

Preferably, the coils 12 and 13 are formed of copper, aluminum or silver. If the coils 12 and 13 are formed of silver, it is possible to achieve extremely small resistance values of the coils 12 and 13. If the coils 12 and 13 are formed of aluminum, it is possible to achieve extremely small weights of the coils 12 and 13.

In the aforementioned transformer 10, the coils 12 and 13 each have a rectangular ring shape as viewed in the plan view of FIG. 3, although the coils 12 and 13 may be of a circular ring shape or other suitable shape. In FIG. 3, the rectangular ring shape of each of the coils 12 and 13 has left and right short sides 15*a* extending parallel to left and right sides of the transformer core 11, and long sides 15*b* perpendicular to the left and right sides of the transformer core 11. As shown in FIG. 3, the coils 12 and 13 are each formed so that a lateral "U" shape coil portion, defined by respective one end portions of the two long sides 15*b* and one of the short sides 15*a* of the coil, appears at, or projects from, each of the left and right sides of the transformer core 11.

Although the two coils 12 and 13 are each preferably formed by the elongated plate-shaped member being bent into the ring shape, the present invention should not be construed as being limited thereto. Alternatively, those coils may be formed by wire windings, for example.

As shown in FIG. 3, the upper helically-formed coil 12 includes an input terminal 12*a* and an output terminal 12*b*. In the illustrated example, the input terminal 12*a* is located lower than the output terminal 12*b*. The lower helically-formed coil 13 includes an input terminal 13*a* and an output terminal 13*b*. In the illustrated example, the input terminal 13*a* is located higher than the output terminal 13*b*. Illustration of the input and output terminals 12*a* and 12*b* of the coil 12 and the input and output terminals 13*a* and 13*b* of the coil 13 shown in FIG. 3 is omitted in FIGS. 1, 2, 4, etc.

Four hatched regions 31, 32, 33 and 34 of the coils 12 and 13, shown in FIG. 3, will be later described in relation to an electric circuit construction shown in FIGS. 5-7.

Inductor cores 14A, 14B, 14C and 14D are provided in corresponding relation to the aforementioned lateral "U" shape coil portions located outwardly of the left and right sides of the transformer core 11. As viewed from the transformer 10, each of the lateral "U" shape coil portions is a projecting portion of the corresponding coil or winding. Because of the four such left and right lateral "U" shape coil portions in the upper and lower coils 12 and 13, four inductor cores 14A, 14B, 14C and 14D are provided with respect to the transformer 10. The four inductor cores 14A, 14B, 14C and 14D are disposed around all of the four short sides of the corresponding coils 12 and 13 each having, for example, four turns. Gap G1 of a given size is formed between each of the inductor cores 14A, 14B, 14C or 14D and the transformer core 11 to separate horizontally-adjoining magnetic fluxes from each other. Further, a gap G2 of a given size is formed between each of the upper inductor cores 14A or 14B and the corresponding lower inductor core 14C or 14D to separate vertically-adjoining magnetic fluxes from each other. By thus separating the vertically-adjoining magnetic fluxes in the upper and lower inductor cores, the instant embodiment can achieve an appropriate magnetic path construction. Note that the aforementioned gaps G1 and G2 each have a width of, for example, 0.5 mm. Each of the ring-shaped inductor cores 14A-14D has a rectangular inner hole H1 through which a corresponding one of the left or right short sides 15*a* of the coils 12 and 13 are passed.

Each of the aforementioned transformer core 11 and inductor cores 14A-14D may be formed of ferrite, powder permalloy, silicon steel plate, amorphous steel plate, permalloy metal or the like. However, if the inductor cores 14A-14D are formed of a material other than powder permalloy, such as ferrite, silicon steel plate, amorphous steel plate, permalloy metal or the like, extremely small gaps have to be formed in the inductor cores 14A-14D with a high accuracy; thus, in the instant embodiment, the inductor cores 14A-14D are formed of powder permalloy. If all of the transformer core 11 and inductor cores 14A-14D are formed of powder permalloy, the inductors would be limited in size although these cores can be readily formed of only one type of material; thus, in the instant embodiment, the transformer core 11 is formed of ferrite. As a consequence, the instant embodiment can achieve an improved combined type transformer which can not only eliminate the need for high-accuracy formation of the gaps but also minimize an iron loss while minimizing required manufacturing cost, and in which magnetic saturation hardly occurs.

In the instant embodiment, two inductors 20 are constituted by the inductor cores 14A-14D and corresponding coils 12 and 13. In other words, a total of four inductor cores 14A-14D are provided for the transformer core 11 and two coils 12 and 13 in such a manner that two inductor cores are disposed at each of the left and right sides of the transformer core 11, and the upper coil 12 functioning as the primary winding is passed through the inner holes H1 of the two upper inductor cores 14A and 14B while the lower coil 13 functioning as the secondary winding is passed through the inner holes H1 of the two lower inductor cores 14C and 14D. In this manner, two, i.e. first and second, inductors 20 are provided with respect to the transformer 10. The single transformer 10 and two inductors 20 are assembled together with the single transformer 10 as a structural base, and two different types of electric components, i.e. transformer and inductors, are implemented on the basis of the single electric structure (i.e., combined type transformer 10).

To explain the combined type transformer 10 from a different viewpoint, in the fundamental construction of the combined type transformer 10, the coils 12 and 13 have projecting coil portions that project outwardly from the opposite side surfaces of the transformer core 11 and the inductor cores 14A, 14B, 14C and 14D are provided using these outwardly-projecting coil portions, so that the two inductors 20 are provided in the combined type transformer 10.

Alternatively, for each of the coils 12 and 13, only a selected one of the inductor cores 14A or 14B, or 14C or 14D may be provided. In another alternative, only a selected one of the four inductor cores 14A-14D may be provided in the entire combined type transformer 10. For the coil 12 or 13 for which no inductor core is provided, the above-mentioned outwardly-projecting coil portion may be dispensed with.

Although the foregoing has described example positional and mounting relationships among the transformer core 11, coils 12 and 13 and inductor cores 14A-14D, illustration of fasteners etc. for fixing the inductor cores 14A-14D etc. is omitted for simplicity in FIGS. 1-4.

In an alternative, the above-mentioned gaps G1 and G2 may be formed in resin sheets formed of, for example, Teflon (registered trademark), and the transformer core 11 and inductor cores 14A-14D and the resin sheets may be bonded together by an adhesive agent, such as an epoxide-based adhesive. In view of various possible conditions of the combined type transformer 10 during use, it is desirable that each of such resin sheets and adhesive agent be of an insulating material having a low magnetic permeability and having a heat resistance of about 100-120 degrees C. It is also desirable that such an insulating material have a rigidity enough to keep constant the sizes of the gaps G1 and G2. Namely, as long as the aforementioned conditions can be met, the sheets may be made of any other suitable material than Teflon (registered trademark) and the adhesive agent may be other than an epoxide-based adhesive, In the instant embodiment of the combined type transformer 10, magnetic fluxes produced in regions S1 and S6 of FIG. 3, of all the magnetic fluxes produced in the coils 12 and 13, are mainly used the inductors. Further, a magnetic flux produced in a region S5 of FIG. 3, of all the magnetic fluxes produced in the coils 12 and 13, is mainly used as the transformer. With the inductor cores 14A-14D provided to cover great areas of the regions S1 and S6, where leakage fluxes used to be produced in the past, as shown in FIG. 3, effective magnetic paths can be formed in the instant embodiment. By an appropriate combination of sectional areas of the regions 51, S5 and S6, magnetic path lengths of the transformer core 11 and inductor cores 14A-14D and material of the inductor cores 14A-14D, the instant embodiment can efficiently secure magnetic fluxes necessary to allow the combined type transformer 10 to perform both of the transformer and inductor functions even if the combined type transformer 10 is of a small size.

Figure 5:
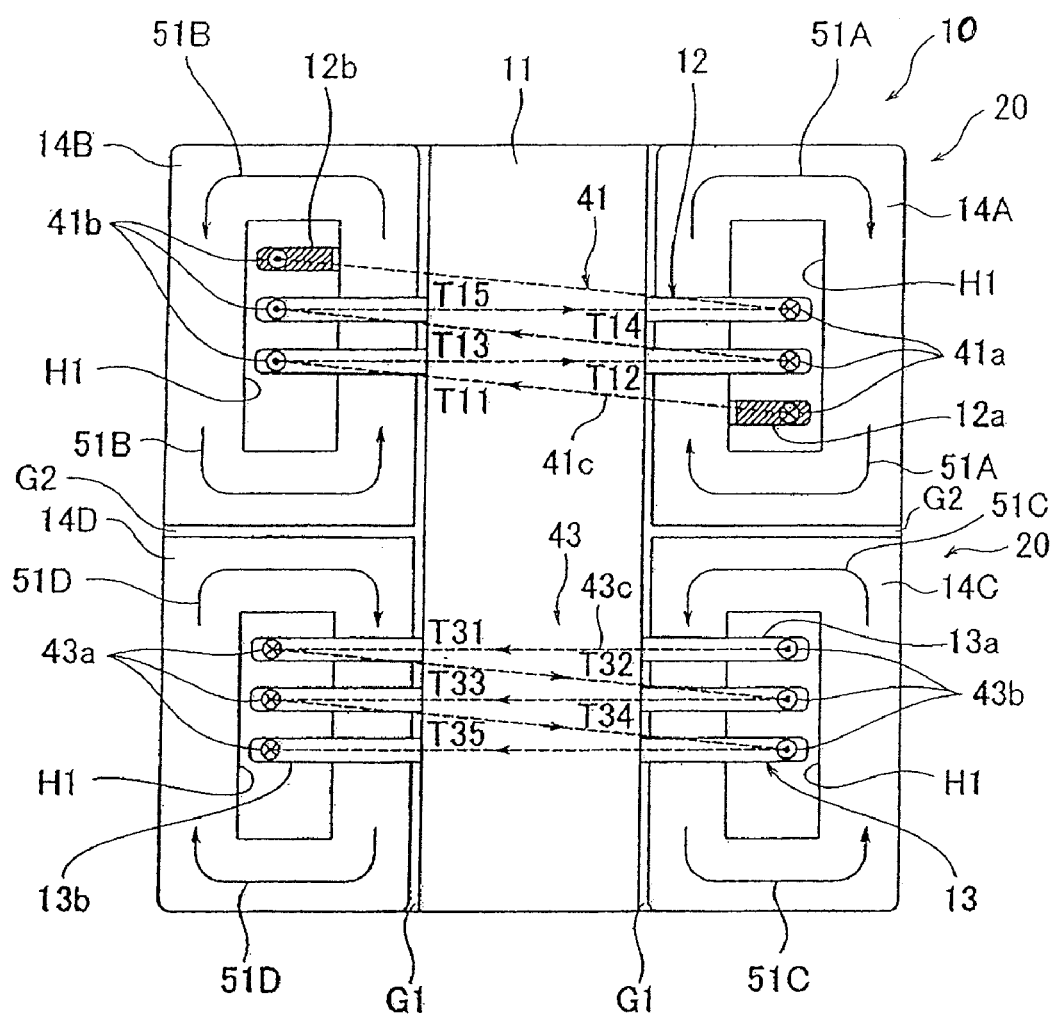
FIG. 5 is a front view of the combined type transformer, which particularly shows coil current flows in the combined type transformer and magnetic characteristics of the combined type transformer.
Figure 6:
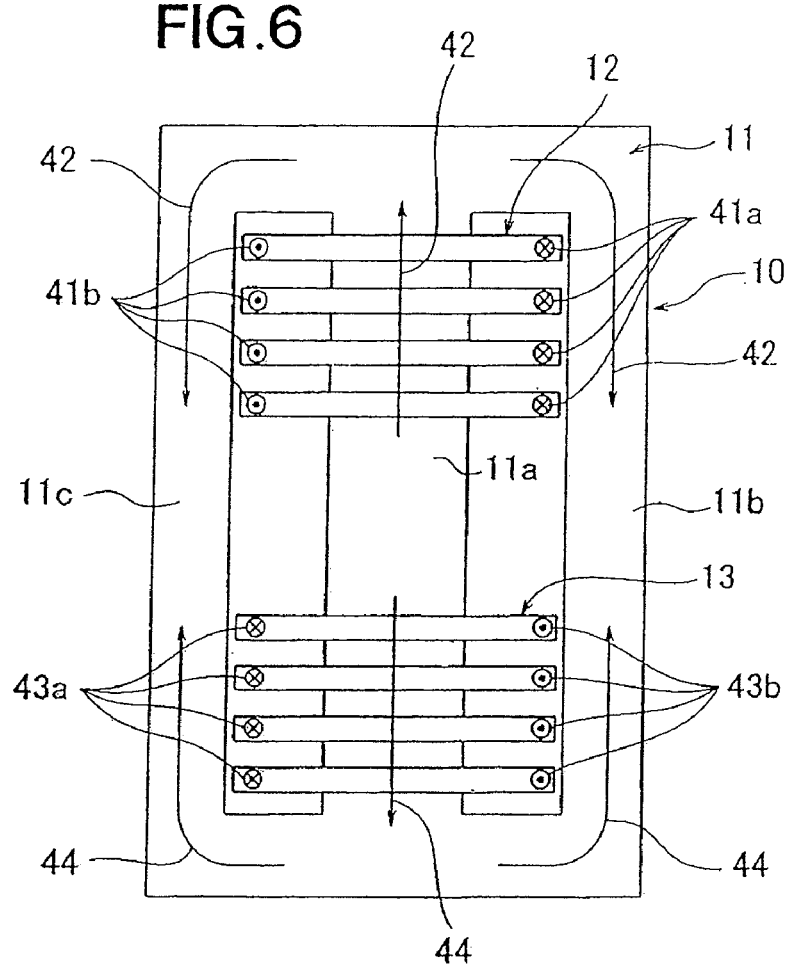
FIG. 6 is a front view similar to FIG. 4 but showing coil current flows and magnetic characteristics in the combined type transformer.

The following lines describe the combined type transformer 10, having the aforementioned shape and construction, in terms of its magnetic characteristics and electric wiring construction, with primary reference to FIGS. 3, 5, 6 and 7. FIGS. 5 and 6, which show magnetic behavior of the transformer 10, corresponds to FIGS. 2 and 4, respectively. In FIGS. 5 and 6, the same elements as in FIGS. 1-4 are indicated by the same reference characters. However, in FIGS. 5 and 7, it is assumed that the number of turns of each of the coils 12 and 13 is about 2.5 rather than 4, just for simplicity of illustration.

First, behavior of the transformer 10 is explained. Let it be assumed that, in FIGS. 5 and 6, an electric current 41 flows through the coil 12 from the input terminal 12a to the output terminal 12b as indicated by energizing-direction marks 41a and 41b and arrow 41c. With this electric current 41, magnetic fluxes are produced primarily in a middle magnetic path portion 11a and left and right side magnetic path portions 11b and 11c of the transformer core 11, as indicated representatively by arrows 42 in FIG. 6.

Let it also be assumed that, in FIGS. 5 and 6, an electric current 43 flows through the coil 13 from the input terminal 13a to the output terminal 13b as indicated by energizing-direction marks 43a and 43b and arrow 43c. With this electric current 43, magnetic fluxes are produced primarily in the middle magnetic path portion 11a and left and right side magnetic path portions 11b and 11c of the transformer core 11, as indicated representatively by arrows 44 in FIG. 6. The magnetic flux direction 42 and magnetic flux direction 44 in the middle magnetic path portion 11a and left and right side magnetic path portions 11b and 11c of the transformer core 11 are opposite from each other.

The aforementioned electro-magnetic relationship is reversed if the directions of the electric currents 41 and 43 flowing through the coils 12 and 13 are reversed.

Once the magnetic flux 42 or 44 is produced in the middle magnetic path portion 11a and left and right side magnetic path portions 11b and 11c of the transformer core 11 with the electric current 41 or 43 flowing through the coil 12 or 13, a magnetic interaction occurs between the coils 12 and 13, which causes a voltage transformation action. In this way, the section that functions as the aforementioned transformer 10 is constituted by the two coils 12 and 13 and transformer core 11. For convenience of illustration and explanation, only principal portions of the magnetic fluxes 42 and 44 are shown representatively in the figures.

The hatched regions 31 and 32 of the coils 12 and 13 shown in FIG. 3 are regions which mainly contribute to production of magnetic fluxes in the transformer core 11 when the electric currents 41 and 43 flow through the windings of the coils 12 and 13. Namely, these hatched regions 31 and 32 are regions achieving the function of the transformer 10.

The inductors 20 behave as follows. As the electric current 41 flows through the coil 12 or the electric current 43 flows through the coil 13, magnetic fluxes represented mainly by magnetic fluxes 51A and 51B are produced in the two inductor cores 14A and 14B, or magnetic fluxes represented mainly by magnetic fluxes 51C and 51D are produced in the two inductor cores 14C and 14D. Namely, the inductor cores 14A and 14B produce magnetic energy (magnetic fluxes 51A and 51B) as the electric current 41 flows through the coil 12, and the section functioning as the first inductor 20 is constituted by the coil 12 and the two inductor cores 14A and 14B. Further, the inductor cores 14C and 14D produce magnetic energy (magnetic fluxes 51C and 51D) as the electric current 43 flows through the coil 13, and the section functioning as the second inductor 20 is constituted by the coil 13 and the two inductor cores 14C and 14D.

Further, the hatched regions 33 and 34 of the coils 12 and 13 shown in FIG. 3 are regions which mainly contribute to production of magnetic fluxes in the inductor cores 14A-14D when the electric currents 41 and 43 flow through the windings of the coils 12 and 13. Namely, these hatched regions 33 and 34 are regions that achieve the function of the inductor 20.

In the combined type transformer 10 as set forth above, the coils 12 and 13 of the transformer 10 are used also as inductor coils, and thus, the transformer 10 and inductors 20 can be implemented as an integral structure by only adding the inductor cores 14A-14D to the coils 12 and 13 of the transformer 10. In this way, there can be provided a small-size, lightweight combined type transformer 10. Further, the combined type transformer 10, comprising a combination of components having rectangular parallelepiped shapes, can be installed in a limited space with a very high space efficiency.

Figure 7:
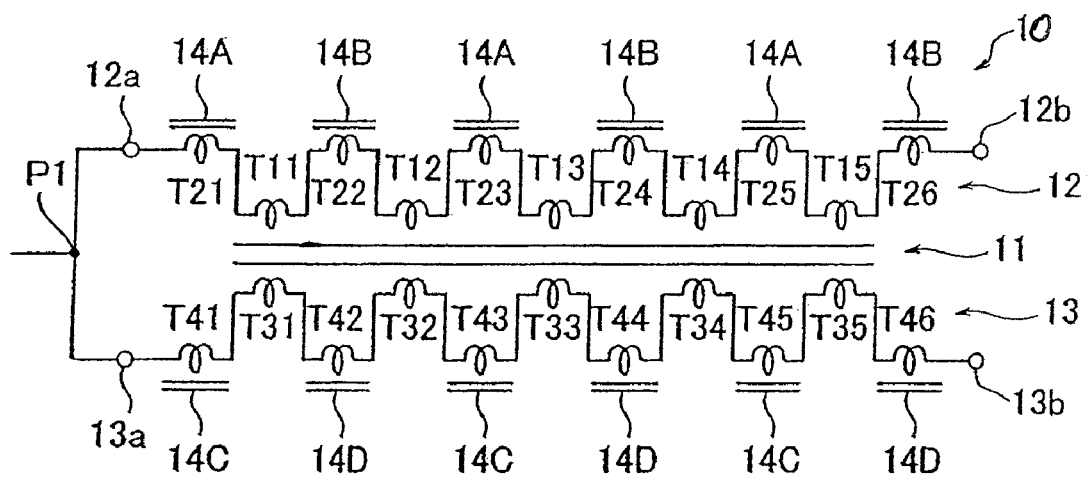
FIG. 7 is a diagram showing an electrical equivalent circuit of the combined type transformer.

FIG. 7 shows an electrical equivalent circuit of the combined type transformer 10 comprising the single transformer 10 and two inductors 20. The equivalent circuit of FIG. 7 is represented on the assumption that the combined type transformer 1 is constructed in the manner as shown in FIG. 5, and the equivalent circuit of the combined type transformer 10 illustrated here includes the coils 12 and 13, transformer core 11 and four inductor cores 14A-14D.

Circuit components corresponding to the coil 12 and located between the input terminal 12a and the output terminal 12b are divided into those contributing to the function of the transformer 10 and those contributing to the function of the first inductor 20. The circuit components contributing to the function of the transformer 10 are winding portions T11, T12, T13, T14 and T15 of the coil 12 corresponding to the above-mentioned regions 31 and 32 related to the transformer core 11. Specific constructions of these winding portions T11, T12, T13, T14 and T15 are illustrated in FIG. 5. Further, the circuit components contributing to the function of the first inductor 20 are winding portions T21, T23 and T25 of the coil 12 corresponding to the above-mentioned region 33 of the inductor core 14A and winding portions T22, T24 and T26 of the coil 12 corresponding to the above-mentioned region 34 of the inductor core 14B. These winding portions extend continuously from the input terminal 12a to the output terminal 12b in predetermined order of "T21→T11→T22→T12→T23→T13→T24→T14→T25→T15→T26", to thereby form the coil 12. For ease of understanding, the inductor cores 14A and 14B are each shown in FIG. 7 as divided to appear alternately in correspondence with the winding portions T21, T23, T25, or T22, T24, T26.

Similarly to the circuit components corresponding to the coil 12, circuit components corresponding to the coil 13 and located between the input terminal 13a and the output terminal 13b are divided into those contributing to the function of the transformer 10 and those contributing to the function of the second inductor 20. The circuit components contributing to the function of the transformer 10 are winding portions T31, T32, T33, T34 and T35 of the coil 13 corresponding to the above-mentioned regions 31 and 32 related to the transformer core 11. Specific constructions of these winding portions T31, T32, T33, T34 and T35 are illustrated in FIG. 5. Further, the circuit components contributing to the function of the second inductor 20 are winding portions T41, T43 and T45 of the coil 13 corresponding to the above-mentioned region 33 of the inductor core 14C and winding portions T42, T44 and T46 of the coil 13 corresponding to the above-mentioned region 34 of the inductor core 14D. These winding portions extend continuously from the input terminal 13a to the output terminal 13b in predetermined order of "T41→T31→T42→T32→T43→T33→T44→T34→T45→T35→T46", to thereby form the coil 13. For ease of understanding, the inductor cores 14A and 14B are each shown in FIG. 7 as divided to appear alternately in correspondence with the winding portions T41, T43, T45, or T42, T44, T46.

The following paragraphs describe a construction and behavior of a DC/DC converter as an example circuit which can use the above-described combined type transformer 10 with an extremely high efficiency.

First, a circuit construction of the DC/DC converter 16 will be described with reference to FIGS. 8A and 8B. In the figure, the DC/DC converter 16 is shown as a dual-port circuit (four-terminal circuit). In the case where the DC/DC converter 16 should operate as a voltage boosting (or raising) DC/DC converter, the left-side port functions as a low-voltage-side input port, while the right-side port functions as a high-voltage-side output port. Conversely, in the case where the DC/DC converter should operate as a voltage bucking (or lowering) DC/DC converter, the right-side port functions as a high-voltage-side input port, while the left-side port functions as a low-voltage-side output port.

Figure 8A:
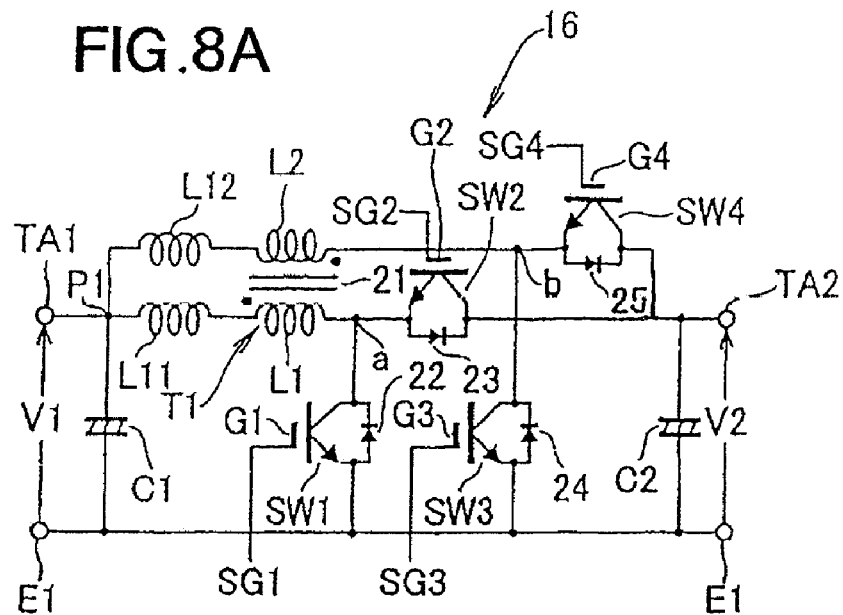
FIGS. 8A and 8B are electric circuit diagrams showing embodiments of a DC/DC converter that employs the combined type transformer of the present invention.
Figure 8B:
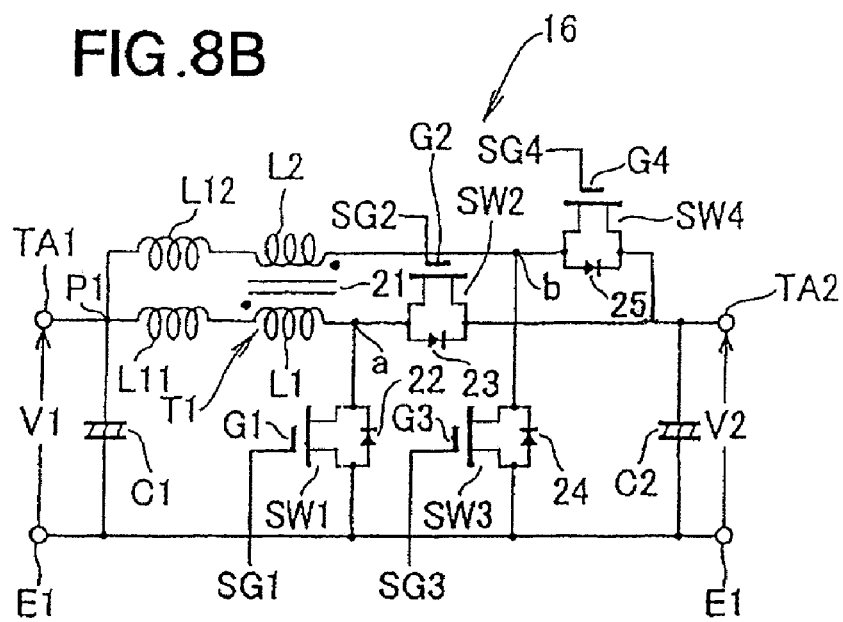

As illustrated in FIGS. 8A and 8B, the DC/DC converter 16 includes a smoothing capacitor C1, inductors (coils) L11 and L12, a transformer T1, four switching elements SW1, SW2, SW3 and SW4, and a smoothing capacitor C2.

The above-described combined type transformer 10 is provided in a circuit section comprising the inductors L11 and L12 and transformer T1. The inductors L11 and L12 correspond to the aforementioned first and second inductors 20, and the transformer T1 corresponds to the aforementioned transformer 10. Further, a connection point P1 between the inductors L11 and L12 corresponds to a left-end connection point P1 shown in FIG. 7.

The smoothing capacitor C1 is connected between a common reference terminal (normally a ground terminal) E1 and a terminal TA1, and the smoothing capacitor C2 is connected between the common reference terminal E1 and a terminal TA2. When a DC voltage V1 has been input to the terminal TA1, a DC voltage V2 is output to the terminal TA2. The DC voltage V1 is lower than the DC voltage V2 (V1 less than V2). The terminals TA1 and TA2 are each a positive (plus)-pole terminal.

The transformer T1 includes a core (ferrite core, iron core or the like) 21, and primary and secondary windings L1 and L2. The core 21 corresponds to the aforementioned transformer core 11, the primary winding L1 corresponds to the aforementioned first coil 12, and the secondary winding L2 corresponds to the aforementioned second coil 13. The primary and secondary windings L1 and L2 are connected with each other and wound in opposite winding directions (i.e., interconnected in an "oppositely-wound configuration"). Winding ratio between the primary winding L1 and the secondary winding L2 is preferably 1:1. In the figure, black dots added to the primary and secondary windings L1 and L2 each indicate a high-potential side of the corresponding winding L1 or L2 when a voltage has been induced therein. If the core 21 is a ferrite core, it is possible to appropriately deal with high frequencies and reduce the weight of the core section.

In the aforementioned transformer T1, the primary and secondary windings L1 and L2 are intercoupled magnetically via the core 21, and the winding ratio between the primary and secondary windings L1 and L2 is 1:1 as noted above. Thus, once an exciting current flows through one of the windings L1 or L2, a voltage corresponding to the winding ratio between the primary and secondary windings L1 and L2 is induced in the other winding L2 or L1. For example, when the switching element SW1 has been turned on so that an electric current flows through the inductor L11 and primary winding L1 on the basis of the input voltage V1, voltages are induced in the inductor L11 and primary winding L1 in accordance with variation in the current. As the current flows through the primary winding L1, a voltage is also induced in the secondary winding L2 through the known mutual induction action. As a consequence, a voltage, corresponding to a sum of the input voltage V1, voltage of the inductor L12 and induced voltage of the secondary winding L2, is produced at the terminal TA2; in this manner, the DC/DC converter 16 performs voltage boosting operation. Similar operation takes place when the switching element SW3 for energizing the secondary winding L2 of the transformer T1; in this case, however, an induced voltage of the inductor L11 rather than the inductor L12 is applied to perform the voltage boosting operation.

The above-mentioned four switching elements SW1-SW4 are each in the form of, for example, an IGBT (Insulator Gate Bipolar Transistor) capable of conducting a high current and withstanding a high voltage. Alternatively, MOSFET transistors may be used as the switching elements SW1-SW4 as necessary, e.g. in cases where it is necessary to address high frequencies. Each of the switching elements SW1-SW4 has collector, emitter and gate terminals. Further, diodes 22, 23, 24, 25 are connected in parallel between the respective collectors and emitters of the switching elements SW1-SW4 in a forward direction from the emitter toward the collector.

The inductors L11 and L12 are each connected at one terminal to the terminal TA1, i.e. upper terminal of the smoothing capacitor C1, and one terminal of the primary winding L1 of the transformer T1 is connected to the other end of the inductor L11 while one terminal of the secondary winding L2 of the transformer T1 is connected to the other end of the inductor L12. Parallel-T circuitry is connected between the terminals TA1 and TA2. The parallel-T circuitry comprises a first T circuit including the inductor L11, primary winding L1 and switching elements SW1 and SW2, and a second T circuit including the inductor L12, secondary winding L2 and switching elements SW3 and SW4.

In the first T circuit, a point between the collector and emitter of the switching element SW1 is connected between a terminal a of the primary winding L1 and the common reference terminal E1, and a point between the emitter and collector of the switching element SW2 is connected between the terminal a and the terminal TA2. Further, in the second T circuit, a point between the collector and emitter of the switching element SW3 is connected between a terminal b of the secondary winding L2 and the common reference terminal E1, and a point between the emitter and collector of the switching element SW4 is connected between the terminal b and the terminal TA2. Gate signals SG1, SG2, SG3 and SG4 for controlling ON/OFF action of the individual switching elements SW1-SW4 are supplied from a not-shown control device to the respective gates G1, G2, G3 and G4 of the four switching elements SW1-SW4.

The following paragraphs describe behavior of the buck-boost DC/DC converter 16. More specifically, the voltage boosting operation of the DC/DC converter 16 will be described with reference to FIGS. 9-14, and the voltage bucking operation of the DC/DC converter 16 will be described with reference to FIGS. 15-20.

Figure 9:
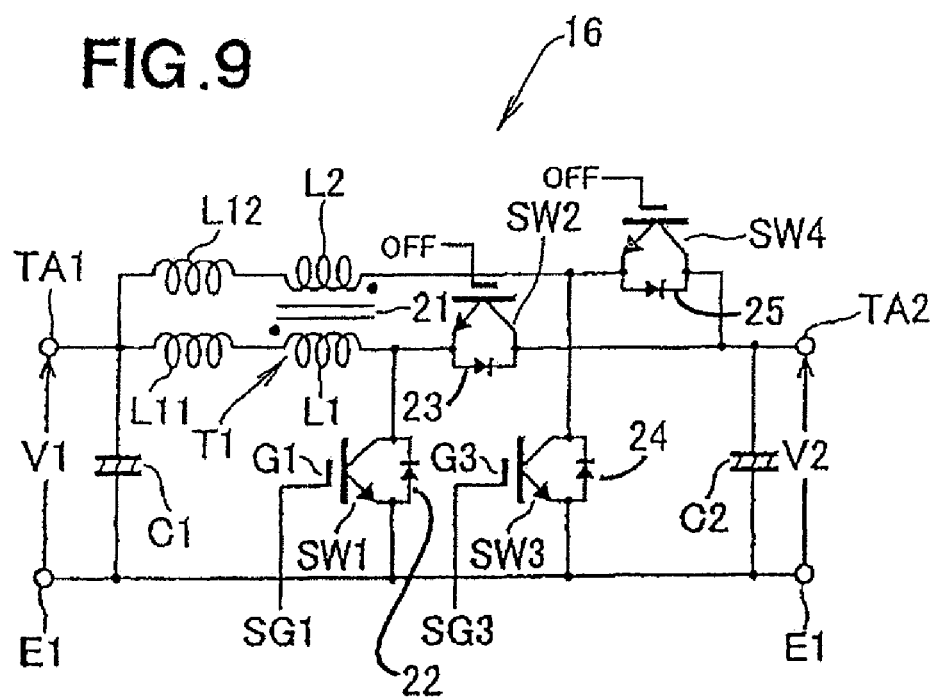
FIG. 9 is an electric circuit diagram of the DC/DC converter, which is explanatory of a construction and behavior of the DC/DC converter when the converter is used as a voltage boosting converter.

First, to perform the voltage boosting operation, the above-mentioned gate signals SG1 and SG3 are given to the respective gates of the switching elements SW1 and SW3, as illustrated in FIG. 9, to turn on/off the switching elements SW1 and SW3. When the input voltage is to be boosted, only OFF signals are given to the respective gates of the switching elements SW2 and SW4 to constantly keep the switching elements SW2 and SW4 in the OFF state. In the voltage boosting DC/DC converter 16, the DC voltage V1 is applied as an input voltage, as illustrated in FIG. 9. In the voltage boosting operation, the DC voltage V1 input to the left-side terminal TA1 is converted so that the DC voltage V2 of a level equal to or greater than the input DC voltage V1 is output from the right-side terminal TA2. In the DC/DC converter 16, the voltage boosting operation is performed in a forward direction from the left, low-voltage side toward the right, high-voltage side.

Figure 10:
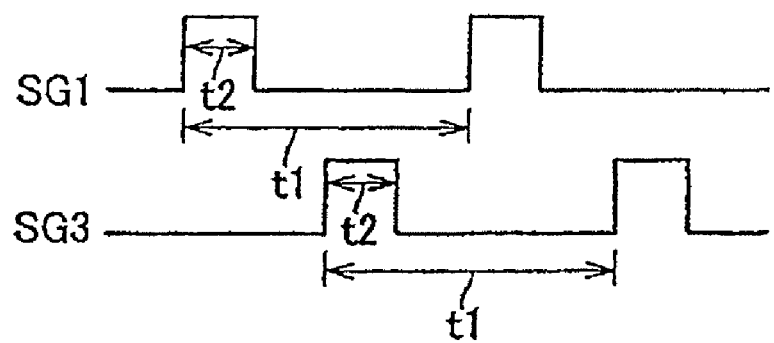
FIG. 10 is a waveform diagram showing waveforms of gate signals applied when the DC/DC converter is used as the voltage boosting converter.

Signal waveforms of the gate signals SG1 and SG3 are shown in FIG. 10. The gate signals SG1 and SG3 are of pulse waveforms having the same period t1 and same duty cycle t2, but these gate signals SG1 and SG3 are phase-shifted from each other by half a period of the signals. Thus, the switching elements SW1 and SW3 alternately repeat the ON/OFF action in response to such gate signals SG1 and SG3. The duty cycle t2, determining the ON time of the switching elements SW1 and SW3, is variable as necessary within a range not exceeding 50 percent. In this manner, the output voltage V2 can be boosted within a range of one to two times the input voltage V1. Alternatively, the duty cycle t2 may be set at 50 percent or more so that switching control is performed to cause the switching elements SW1 and SW3 to be turned on simultaneously; in this case, it is possible to achieve a voltage boost ratio of over two, depending on the performance (e.g., inductance constant) of the inductors L11 and L12.

Figure 11:
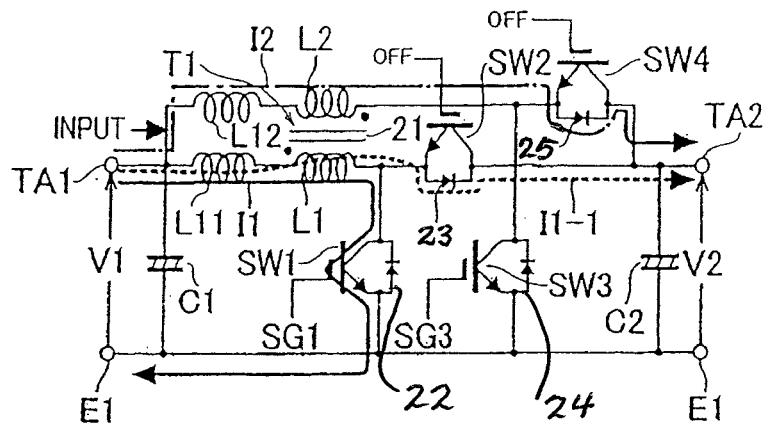
FIG. 11 is a diagram explanatory of a first example of voltage boosting operation of the DC/DC converter.
Figure 12:
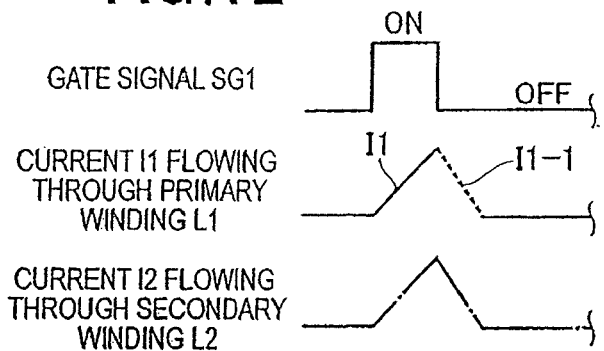
FIG. 12 is a waveform diagram showing waveforms of a gate signal and electric currents in the first example of the voltage boosting operation of the DC/DC converter.
Figure 13:
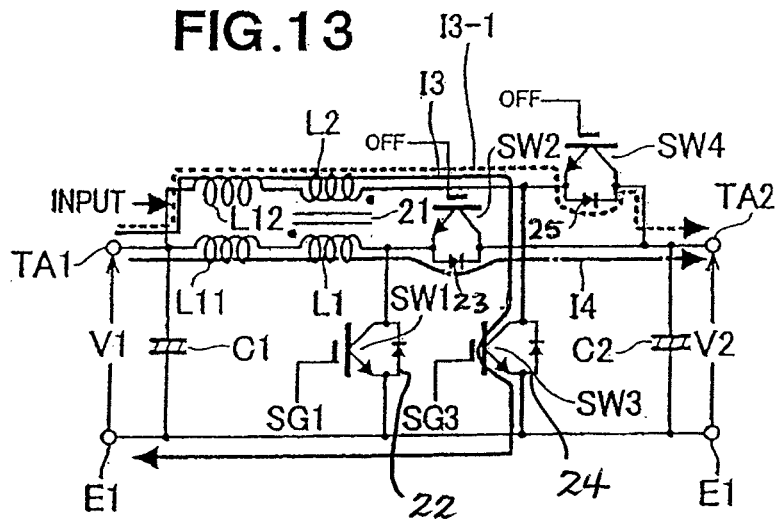
FIG. 13 is a diagram explanatory of a second example of the voltage boosting operation of the DC/DC converter.

The voltage boosting operation of the DC/DC converter 16 will now be described in greater detail with reference to FIGS. 11-14. FIG. 11 shows current flows in the individual circuit components of the DC/DC converter 16 when only the switching element SW1 is turned on to energize the primary winding L1 of the transformer T1. FIG. 13 shows current flows in the individual circuit components of the DC/DC converter 16 when only the switching element SW3 is turned on to energize the secondary winding L2 of the transformer T1.

In the DC/DC converter 16 shown in FIG. 11, the gate signal SG1 is supplied to the gate of the switching element SW1 to turn on/off the switching element SW1; when the gate signal SG1 is ON, the switching element SW1 is turned on. Because the DC voltage V1 has been input to the terminal TA1, an exciting current I1 flows through the primary winding L1 of the transformer T1 once the switching element SW1 is turned on. This exciting current I1 flows through a route of the terminal TA1, inductor L11, primary winding L1 and switching element SW1. While the gate signal SG1 is ON, the energizing current I1 gradually increases in level. Once the gate signal SG1 turns into the OFF state, the exciting current I1 decreases in level. Broken-line portion I1-1 of the exciting current I1 shown in FIG. 12 represents a current portion that flows as a result of discharge of energy accumulated in the inductor L11. The energizing current represented by the broken-line portion I1-1 decreases in level more slowly (i.e., taking a longer time) as the inductance of the inductor L11 is greater. This exciting current I1-1 flows, through the primary winding L1 and diode 23 of the switching element SW2, to the terminal TA2.

As the exciting current I1 flows through the primary winding L1 of the transformer T1 as set forth above, a load current I2 is produced in the secondary winding L2 on the basis of the mutual induction action. The load current I2 flows, through the diode 25 of the switching element SW4, to the terminal TA2. As shown in FIG. 12, the load current I2 thus produced in the secondary winding L2 has variation characteristics substantially identical in shape to the exciting current I1 and also has substantially the same level values as the exciting current I1 on the basis of the winding ratio (1:1). The smoothing capacitor C2 is charged with the load current I2, as a result of which the DC voltage V2 is output to the terminal TA2 on the basis of the load current I2.

Figure 14:
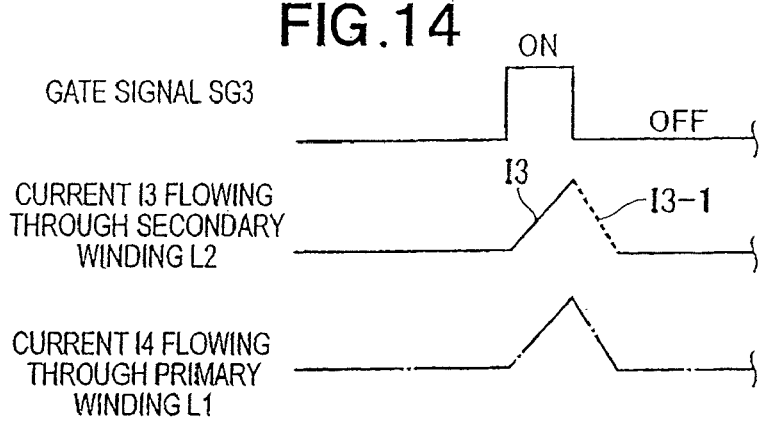
FIG. 14 is a waveform diagram showing waveforms of a gate signal and electric currents in the second example of the voltage boosting operation of the DC/DC converter.

Referring now to FIG. 13, the gate signal SG3 is supplied to the gate of the switching element SW3 to turn on/off the switching element SW3. The switching element SW3 is kept in the ON state while the gate signal SG3 is ON, as illustrated in FIG. 14. The DC voltage V1 has been input to the terminal TA1, and thus, an exciting current I3 flows through the secondary winding L2 of the transformer T1 once the switching element SW3 is turned on. This exciting current I3 flows through a route of the terminal TA1, inductor L12, secondary winding L2 and switching element SW3. While the gate signal SG3 is ON, the exciting current I3 gradually increases in level. Once the gate signal SG3 turns into the OFF state, the exciting current I3 decreases in level. Broken-line portion I3-1 of the exciting current I3 shown in FIG. 14 represents a current portion that flows as a result of discharge of energy accumulated in the inductor L12. The exciting current represented by the broken-line portion 13-1 decreases in level more slowly (i.e., taking a longer time) as the inductance of the inductor L12 is greater. This exciting current flows, through the secondary winding L2 and diode 25 of the switching element SW4, to the terminal TA2.

As the exciting current I3 flows through the secondary winding L2 of the transformer T1 as set forth above, a load current I4 is produced in the primary winding L1 on the basis of the mutual induction action. As shown in FIG. 14, the load current I4 thus produced in the primary winding L1 has variation characteristics substantially identical in shape to the exciting current I3 and also has substantially the same level values as the exciting current I3 on the basis of the winding ratio (1:1). The smoothing capacitor C2 is charged with the load current I4, as a result of which the DC voltage V2 is output to the terminal TA2 on the basis of the load current I4.

As set forth above, the voltage boosting operation of the DC/DC converter 16 is based on a magnetic-field-cancellation type circuit section (L1, L2 and 21). Namely, once the switching element SW1 is turned on while the switching element SW3 is turned off, an exciting current flows through the primary winding L1, and a load current flows through the secondary winding L2. Further, once the switching element SW3 is turned on while the switching element SW1 is turned off, an exciting current flows through the secondary winding L2, and a load current flows through the primary winding L1. Thus, in the transformer T1, energization is performed alternately in the positive and negative directions, so that greater magnetic flux density regions of the cores can be utilized. Consequently, even with smaller cores than the conventional counterparts, the DC/DC converter 16 can appropriately handle greater electric power. Namely, the above-described inventive arrangements can achieve a significant reduction in size (i.e., minitualization) of the DC/DC converter 16. In addition, because the above-described combined type transformer 10 is employed in the circuit section comprising the inductors L11 and L12 and transformer T1, it is possible to achieve a reduced size and weight of the transformer section.

Figure 15:
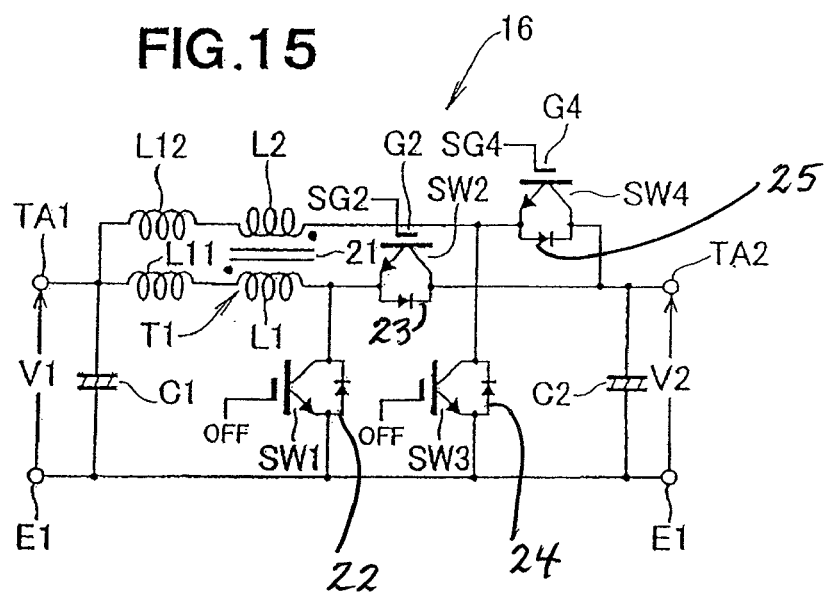
FIG. 15 is an electric circuit diagram of the DC/DC converter, which is explanatory of a construction and behavior of the DC/DC converter when the converter is used as a voltage bucking converter.

Next, the voltage bucking operation of the DC/DC converter 16 will be described with reference to FIGS. 15-20. To perform the voltage bucking operation, the above-mentioned gate signals SG2 and SG4 are given to the respective gates of the switching elements SW2 and SW4 to turn on/off the switching elements SW2 and SW4, as shown in FIG. 15. When the voltage is to be lowered, only OFF signals are given to the respective gates of the switching elements SW1 and SW3 to constantly keep the switching elements SW1 and SW3 in the OFF state. In this voltage bucking DC/DC converter 16, the DC voltage V2 is applied as an input voltage, as illustrated in FIG. 15. In the voltage bucking operation, the DC voltage V2 applied to the right-side terminal TA2 as the input voltage is converted so that the DC voltage V1 of a level equal to or lower than the input DC voltage V2 is output from the left-side terminal TA1. In the DC/DC converter 16, the voltage bucking operation is performed in a reverse direction from the right, high-voltage side toward the left, low-voltage side.

Figure 16:
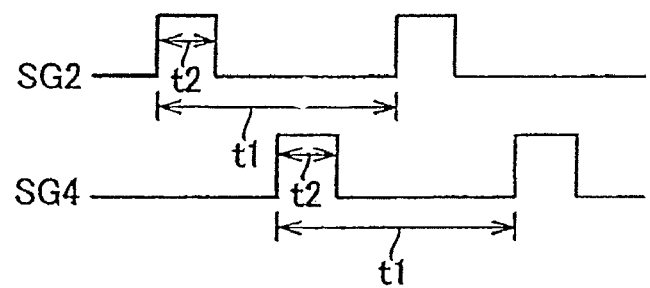
FIG. 16 is a waveform diagram showing waveforms of gate signals applied when the DC/DC converter is used as the voltage bucking converter.

Signal waveforms of the gate signals SG2 and SG4 are shown in FIG. 16. The gate signals SG2 and SG4 are of pulse waveforms having the same period t1 and same duty cycle t2, but these gate signals SG2 and SG4 are phase-shifted from each other so that the two signals SG2 and SG4 are not turned on simultaneously. The switching elements SW2 and SW4 alternately repeat ON/OFF action in response to such gate signals SG2 and SG4. The duty cycle t2, determining the ON time of the switching elements SW2 and SW4, is variable as necessary within a range not exceeding 50 percent so as to avoid the switching elements SW2 and SW4 from being turned on simultaneously. In this manner, the output voltage V1 can have a level lowered from the level of the input voltage V2 within a range of one to 0.5 times the input voltage V2.

Figure 17:
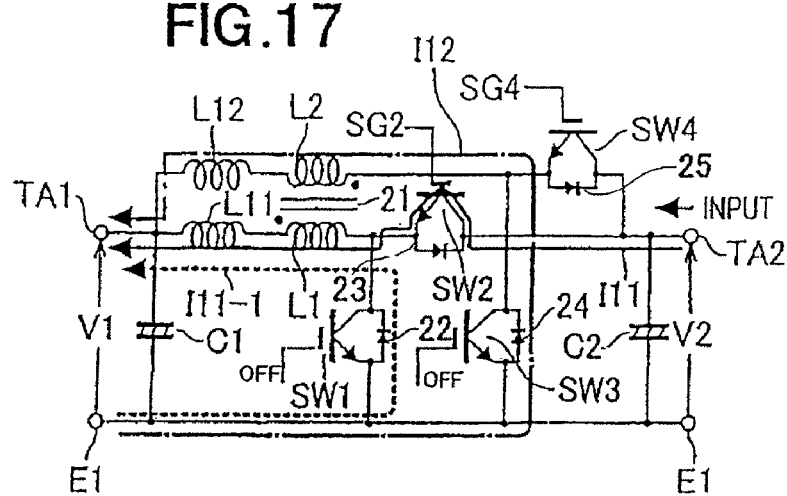
FIG. 17 is a diagram explanatory of a first example of voltage bucking operation of the DC/DC converter.

The voltage bucking operation of the DC/DC converter 16 will now be described in greater detail with reference to FIGS. 17-20. FIG. 17 shows current flows in the individual circuit components of the DC/DC converter 16 when only the switching element SW2 is turned on to energize the primary winding L1 of the transformer T1. Further, FIG. 19 shows current flows in the individual circuit components of the DC/DC converter 16 when only the switching element SW4 is turned on to energize the secondary winding L2 of the transformer T1.

Figure 18:
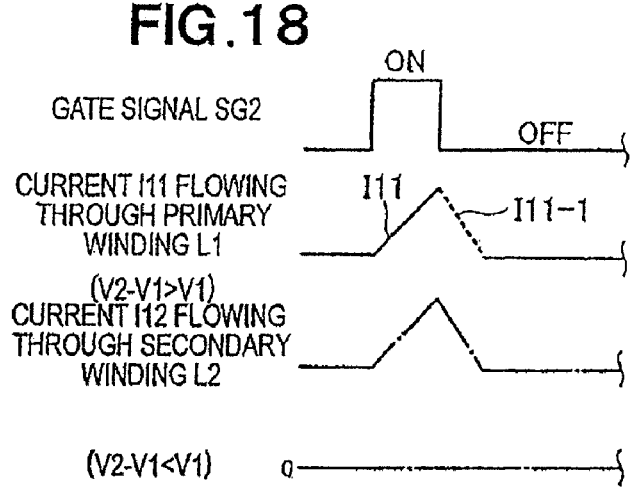
FIG. 18 is a waveform diagram showing waveforms of a gate signal and electric currents in the first example of the voltage bucking operation of the DC/DC converter.

In the DC/DC converter 16 shown in FIG. 17, the gate signal SG2 is supplied to the gate of the switching element SW2 to turn on/off the switching element SW2. The switching element SW2 is kept ON while the gate signal SG2 is ON, as illustrated in FIG. 18. Because the DC voltage V2 has been input to the terminal TA2, an exciting current I11 flows through the primary winding L1 of the transformer T1 once the switching element SW2 is turned on. This exciting current I11 flows through a route of the terminal TA2, switching element SW2, primary winding L1, inductor L11 and terminal TA1. While the gate signal SG2 is ON, the exciting current I11 gradually increases in level. Once the gate signal SG2 turns into the OFF state, the exciting current I11 decreases in level. Broken-line portion I11-1 of the exciting current I11 shown in FIG. 18 represent a current portion that flows as a result of discharge of energy accumulated in the inductor L0. The exciting current represented by the broken-line portion I11-1 decreases in level more slowly (i.e., taking a longer time) as the inductance of the inductor L11 is greater. This exciting current flows, through the diode 22 of the switching element SW1, primary winding L1 and inductor L11, to the terminal TA1.

As the exciting current I11 flows through the primary winding L1 of the transformer T1 as set forth above, a load current I12 is produced in the secondary winding L2 on the basis of the mutual induction action as long as V2-V1 greater than V1, but no load current is produced in the secondary winding L2 if V2-V1 less than V1. The load current I12 flows, through the diode 24 of the switching element SW3, to the terminal TA1. As shown in FIG. 18, the load current I12 thus produced in the secondary winding L2 has variation characteristics substantially identical in shape to the exciting current I11 and also has substantially the same level values as the exciting current I11 on the basis of the winding ratio (1:1). The smoothing capacitor C1 is charged with the load current I12, as a result of which the DC voltage V1 is output to the terminal TA1 on the basis of the load current I12.

Figure 19:
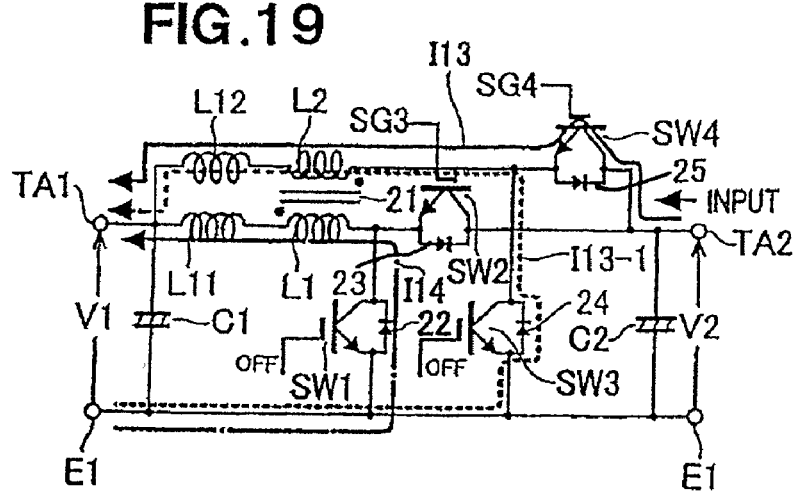
FIG. 19 is a diagram explanatory of a second example of the voltage bucking operation of the DC/DC converter.
Figure 20:
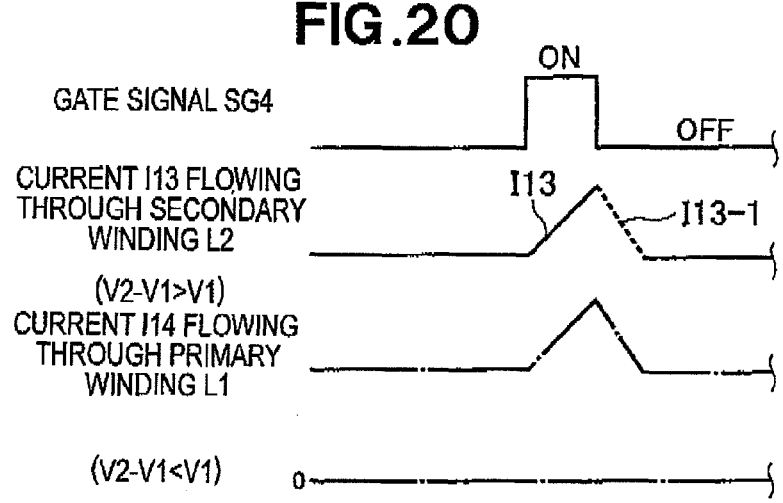
FIG. 20 is a waveform diagram showing waveforms of a gate signal and electric currents in the second example of the voltage bucking operation of the DC/DC converter.

Referring now to FIG. 19, the gate signal SG4 is supplied to the gate of the switching element SW4 to turn on/off the switching element SW4. As illustrated in FIG. 20, the switching element SW4 is kept ON while the gate signal SG4 is ON, as illustrated in FIG. 20. The DC voltage V2 has been input to the terminal TA2, and thus, an exciting current I13 flows through the secondary winding L2 of the transformer T1 once the switching element SW4 is turned on. This exciting current I13 flows through a route of the terminal TA2, switching element SW4, secondary winding L2 and inductor L12. While the gate signal SG4 is ON, the exciting current I13 gradually increases in level. Once the gate signal SG4 turns into the OFF state, the exciting current I13 decreases in level. Broken-line portion I13-1 of the exciting current I13 shown in FIG. 20 represents a current portion that flows as a result of discharge of energy accumulated in the inductor L12. The exciting current represented by the broken-line portion I13-1 decreases in level more slowly (i.e., taking a longer time) as the inductance of the inductor L12 is greater. This exciting current flows, through the diode 24 of the switching element SW3, secondary winding L2 and inductor L12, to the terminal TA1.

As the exciting current I13 flows through the secondary winding L2 of the transformer T1 as set forth above, a load current I14 is produced in the primary winding L1 on the basis of the mutual induction action as long as V2-V1 greater than V1, but no load current is produced in the primary winding L1 if V2-V1 less than V1. As shown in FIG. 20, the load current I14 thus produced in the produced winding L1 has variation characteristics substantially identical in shape to the exciting current I13 and also has substantially the same level values as the exciting current I13 on the basis of the winding ratio (1:1). The smoothing capacitor C1 is charged with the load current I14, as a result of which the DC voltage V1 is output to the terminal TA1 on the basis of the load current I14.

As set forth above, the voltage bucking operation of the DC/DC converter 16 is based on the magnetic-field-cancellation type circuit section (L1, L2 and 21). Namely, once the switching element SW2 is turned on while the switching element SW4 is turned off, an exciting current flows through the primary winding L1, and a load current flows through the secondary winding L2. Thus, in the transformer T1, energization is performed alternately in the positive and negative directions, so that greater magnetic flux density regions of the cores can be utilized. Consequently, even with smaller windings (coils) than the conventional counterparts, the DC/DC converter 16 can appropriately handle greater electric power.

Namely, the above-described inventive arrangements can achieve a significant reduction in size of the DC/DC converter 16.

Figure 21:
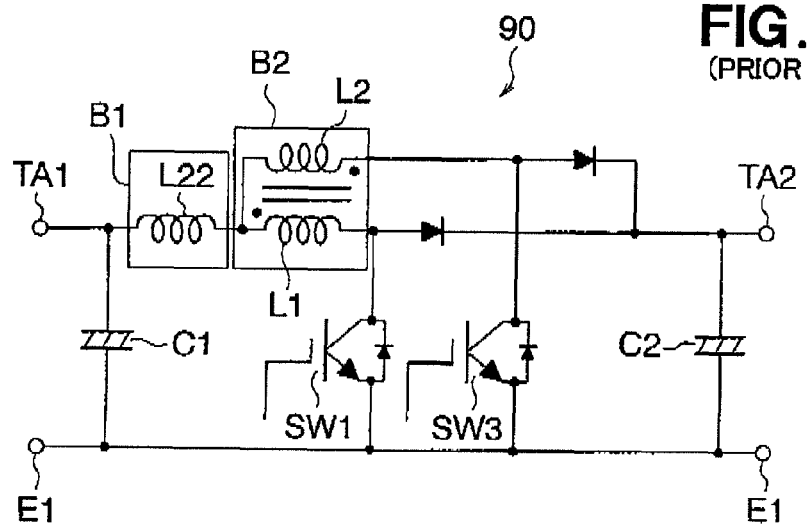
FIG. 21 is an electric circuit diagram of a conventional DC/DC converter 90 provided for comparison with the DC/DC converter shown in FIGS. 8A and 8B.
Figure 22:
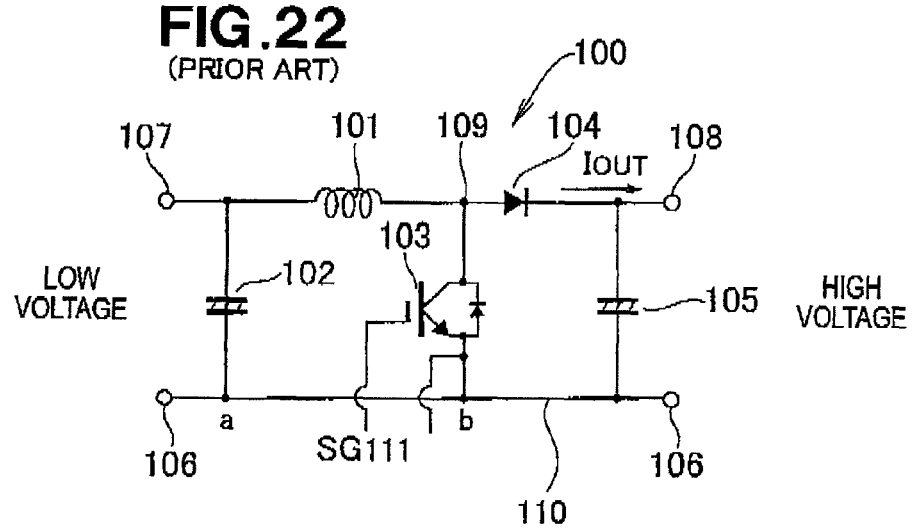
FIG. 22 is an electric circuit diagram showing a conventionally-known DC/DC converter.
Figure 23:
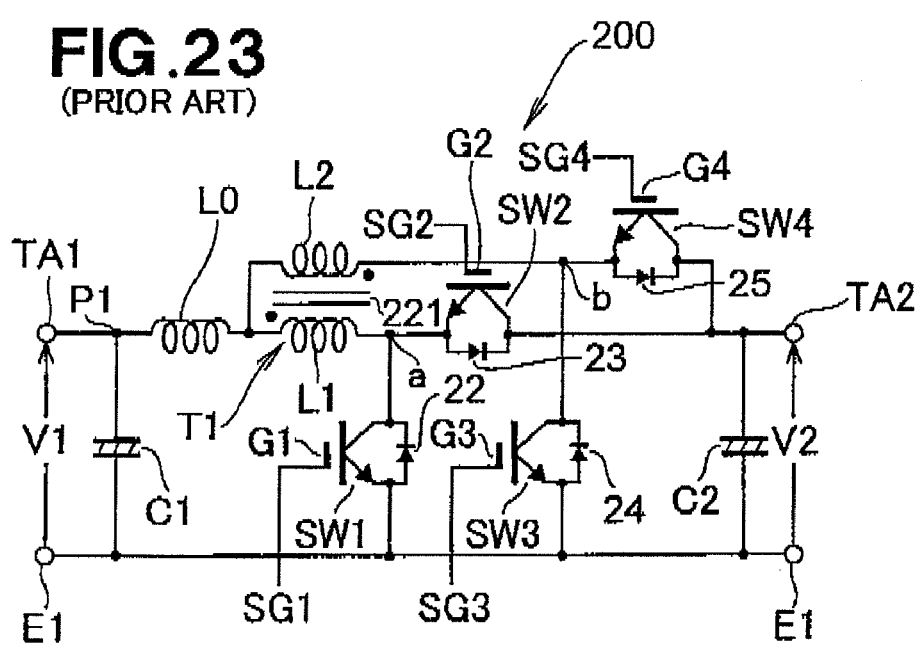
FIG. 23 is an electric circuit diagram showing another conventionally-known DC/DC converter.
Figure 24A:
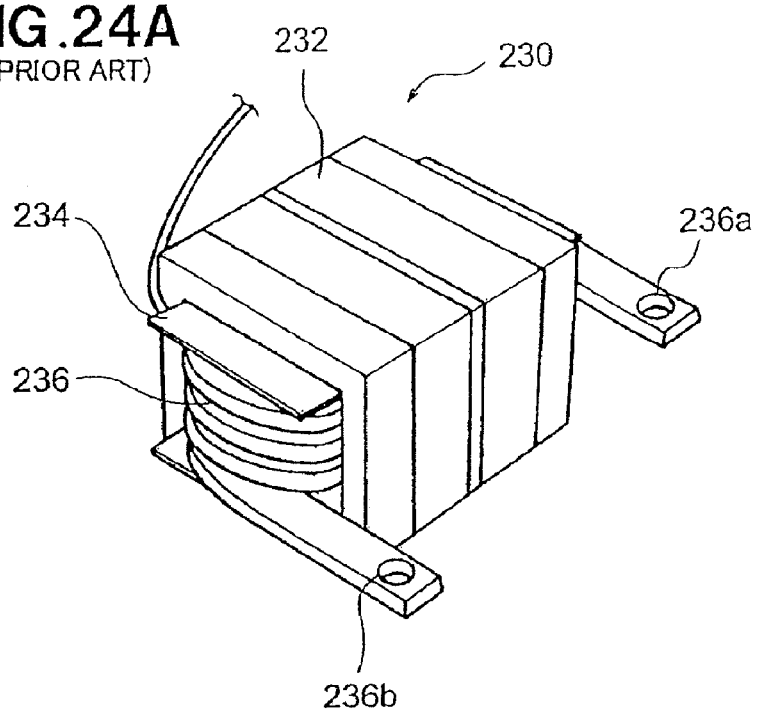
FIGS. 24A and 24B are perspective and plan views, respectively, of an inductor employed in the conventionally-known DC/DC converter.
Figure 24B:
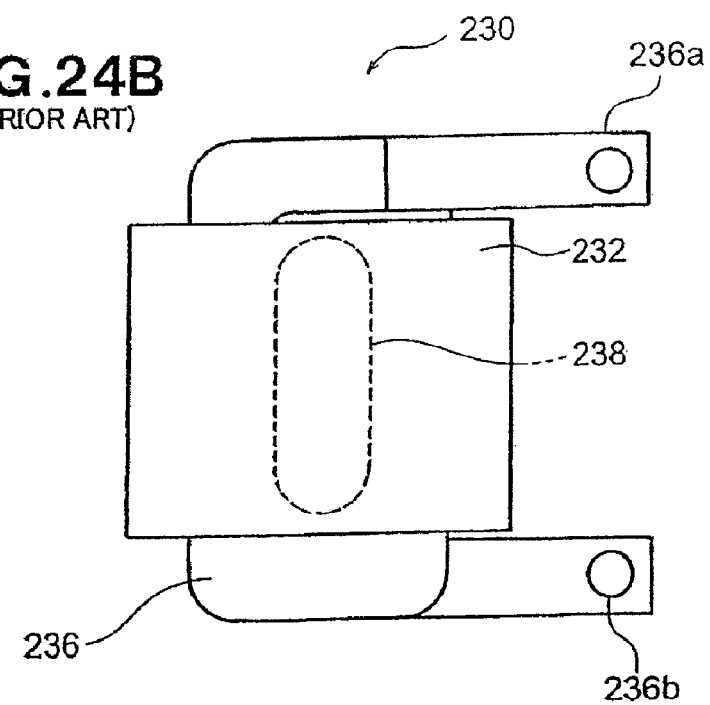
Figure 25A:
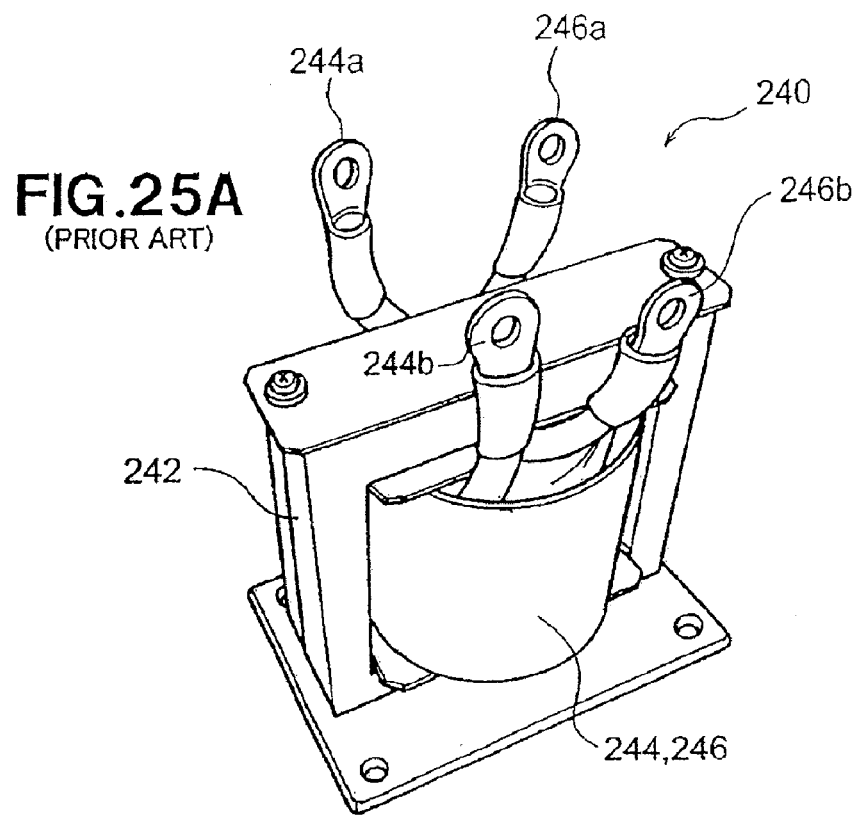
FIGS. 25A and 25B are perspective and plan views, respectively, of a transformer employed in the conventionally-known DC/DC converter.
Figure 25B:
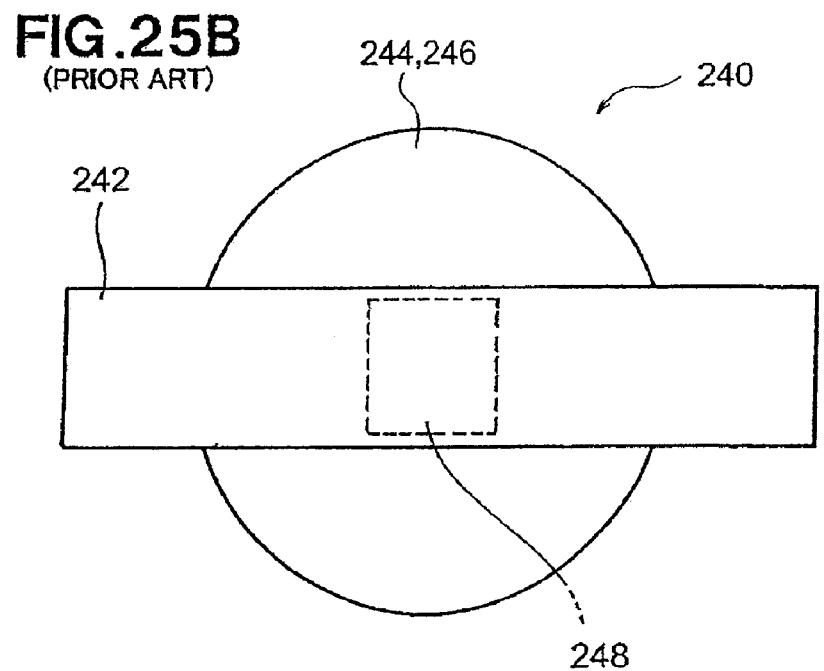

FIG. 21 is an electric circuit diagram of a conventional DC/DC converter 90 provided for comparison with the of the DC/DC converter 16 shown in FIGS. 8A and 8B. In constructing such a circuit as shown in FIG. 21, an inductor section and transformer section are normally formed separately from each other; namely, a block section B1 (comprising an inductor L22) and block section B2 (comprising a transformer) of FIG. 21 are constructed separately. However, according to the combined type transformer 10 of the present invention, where the inductors L11 and L12 and the transformer T1 are formed integrally in a compact size, it is possible to provide an improved DC/DC converter 16 having a reduced number of component parts (e.g., number of coils) and having a reduced size and weight of the entire circuit as compared to the circuit of FIG. 21.

Through the function to buck the output voltage V1 relative to the input voltage V2, the output voltage V1 output from the terminal TA1 can be realized as a sum of the voltage based on the inductor L12 and voltage based on the secondary winding L2 of the transformer T1. Thus, the voltage bucking operation of the DC/DC converter 16 can lower the level of the input voltage V2 within a range of one to 0.5 times the input voltage V2, by varying the duty cycle t2 of the switching elements SW2 and SW4 within a range not exceeding 50 percent.

It should be appreciated that the constructions, shapes, sizes, positional relationships have been outlined above only to the extent that the present invention can be appropriately understood and carried out, and that the numerical values and materials given above are just illustrative. Namely, the present invention should not be construed as limited to the above-described embodiments and may be modified variously unless it departs from the technical scope indicated by the claims.

The combined type transformer of the present invention can be suitably used as an electric circuit component of an inductor and transformer within a DC/DC converter that is employed in a power supply section of an electric vehicle, and the like.

Obviously, various minor changes and modifications of the present invention are possible in light of the above teaching. It is therefore to be understood that within the scope of the appended claims the invention may be practiced otherwise than as specifically described.

What is claimed is:

1. A voltage buck/boost circuit comprising:
a combined type transformer comprising:
a transformer core;
an inductor core; and
first and second coils each wound around said transformer core and also said inductor core and each generating magnetic flux when energized, said first and second coils being each connected at one end thereof to a positive-pole terminal of a first terminal;
wherein the transformer core and said first and second coils form a transformer, and said inductor core and said first and second coils form an inductor,
wherein said first coil and said second coil are connected with each other and wound in opposite winding directions so that a direction of the magnetic flux generated from said first coil is opposite to a direction of the magnetic flux generated from said second coil, and
wherein said first and second coils each have a plurality of first winding portions contributing to a function of the transformer and generating magnetic flux passing through the transformer core, and a plurality of second winding portions contributing to a function of the inductor and generating magnetic flux passing through the inductor core, the first winding portions and the second winding portions being disposed alternatively with each other;
a first switching element connected at one end thereof to another end of the first coil and connected at another end thereof to a common reference terminal;
a second switching element connected at one end thereof to the other end of said first coil and connected at another end thereof to a positive-pole terminal of a second terminal;
a third switching element connected at one end thereof to another end of the second coil and connected at another end thereof to the common reference terminal; and
a fourth switching element connected at one end thereof to the other end of said second coil and connected at another end thereof to the positive-pole terminal of said second terminal.

2. The voltage buck/boost circuit of claim 1 wherein each of said switching elements comprises an Insulated-Gate Bipolar Transistor.

3. The voltage buck/boost circuit of claim 1, wherein each of said switching elements comprises a Metal-Oxide-Semiconductor Field-Effect Transistor.

4. The voltage buck/boost circuit of claim 1, wherein the transformer core has a middle magnetic path portion and side magnetic portions located at both sides of the middle magnetic portion, and
the first coil is provided in an upper region of the middle portion, while the second coil is provided in a lower region of the middle magnetic portion.

5. The voltage buck circuit of claim 1, wherein the inductor core includes first, second, third, and fourth inductor cores; and
the first coil is wound around said transformer core and said first and second inductor cores, and
the second coil is wound around said transformer core and said third and fourth inductor cores.

6. A voltage boost circuit comprising:
a combined type transformer comprising:
a transformer core;
an inductor core; and
first and second coils each wound around said transformer core and also said inductor core and each generating magnetic flux when energized, said first and second coils being each connected at one end thereof to a positive-pole terminal of a first terminal;
wherein the transformer core and said first and second coils form a transformer, and said inductor core and said first and second coils form an inductor,
wherein said first coil and said second coil are connected with each other and wound in opposite winding directions so that a direction of the magnetic flux generated from said first coil is opposite to a direction of the magnetic flux generated from said second coil, and
wherein said first and second coils each have a plurality of first winding portions contributing to a function of the transformer and generating magnetic flux passing through the transformer core, and a plurality of second winding portions contributing to a function of the inductor and generating magnetic flux passing through the inductor core, the first winding portions and the second winding portions being disposed alternatively with each other;

a first switching element connected at one end thereof to another end of the first coil and connected at another end thereof to a common reference terminal;

a first diode connected at one end thereof to the other end of said first coil and connected at another end thereof to a positive-pole terminal of a second terminal;

a second switching element connected at one end thereof to another end of said second coil and connected at another end thereof to the common reference terminal; and a second diode connected at one end thereof to the other end of said second coil and connected at another end thereof to the positive-pole terminal of said second terminal.

7. The voltage boost circuit of claim 6, wherein each of said switching elements comprises an Insulated-Gate Bipolar Transistor.

8. The voltage boost circuit of claim 6, wherein each of said switching elements comprises a Metal-Oxide-Semiconductor Field-Effect Transistor.

9. The voltage boost circuit of claim 6, wherein the transformer core has a middle magnetic path portion and side magnetic portions located at both sides of the middle magnetic portion, and the first coil is provided in an upper region of the middle portion, while the second coil is provided in a lower region of the middle magnetic portion.

10. The voltage buck circuit of claim 6, wherein the inductor core includes first, second, third, and fourth inductor cores; and the first coil is wound around said transformer core and said first and second inductor cores, and the second coil is wound around said transformer core and said third and fourth inductor cores.

11. A voltage buck circuit comprising:
a combined type transformer comprising:
a transformer core;
an inductor core; and
first and second coils each wound around said transformer core and also said inductor core and each generating magnetic flux when energized, said first and second coils being each connected at one end thereof to a positive-pole terminal of a first terminal;

wherein the transformer core and said first and second coils form a transformer, and said inductor core and said first and second coils form an inductor, wherein said first coil and said second coil are connected with each other and wound in opposite winding directions so that a direction of the magnetic flux generated from said first coil is opposite to a direction of the magnetic flux generated from said second coil, and wherein said first and second coils each have a plurality of first winding portions contributing to a function of the transformer and generating magnetic flux passing through the transformer core, and a plurality of second winding portions contributing to a function of the inductor and generating magnetic flux passing through the inductor core, the first winding portions and the second winding portions being disposed alternatively with each other;

a first diode connected at one end thereof to another end of said first coil and connected at another end thereof to a common reference terminal;

a first switching element connected at one end thereof to the other end of said first coil and connected at another end thereof to a positive-pole terminal of a second terminal;

a second diode connected at one end thereof to another end of said second coil and connected at another end thereof to the common reference terminal; and a second switching element connected at one end thereof to the other end of said second coil and connected at another end thereof to the positive-pole terminal of said second terminal.

12. The voltage buck circuit of claim 11, wherein each of said switching elements comprises an Insulated-Gate Bipolar Transistor.

13. The voltage buck circuit of claim 11, wherein each of said switching elements comprises a Metal-Oxide-Semiconductor Field-Effect Transistor.

14. The voltage buck circuit of claim 11, wherein the transformer core has a middle magnetic path portion and side magnetic portions located at both sides of the middle magnetic portion, and the first coil is provided in an upper region of the middle portion, while the second coil is provided in a lower region of the middle magnetic portion.

15. The voltage buck circuit of claim 11, wherein the inductor core includes first, second, third, and fourth inductor cores; and the first coil is wound around said transformer core and said first and second inductor cores, and the second coil is wound around said transformer core and said third and fourth inductor cores.

* * * * *